United States Patent
Takano

(10) Patent No.: US 9,949,255 B2
(45) Date of Patent: *Apr. 17, 2018

(54) COMMUNICATION DEVICE AND COMMUNICATION METHOD FOR DETERMINING A COMBINATION OF BASE STATIONS USED TO COMMUNICATE WITH A COMMUNICATION TERMINAL

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,705

(22) Filed: Mar. 15, 2017

(65) Prior Publication Data

US 2017/0201970 A1 Jul. 13, 2017

Related U.S. Application Data

(63) Continuation of application No. 14/123,654, filed as application No. PCT/JP2012/004066 on Jun. 22, 2012, now Pat. No. 9,655,032.

(30) Foreign Application Priority Data

Jul. 7, 2011 (JP) ................................. 2011-150550

(51) Int. Cl.
*H04W 72/00* (2009.01)
*H04W 72/04* (2009.01)
(Continued)

(52) U.S. Cl.
CPC .......... *H04W 72/042* (2013.01); *H04B 7/024* (2013.01); *H04B 17/318* (2015.01);
(Continued)

(58) Field of Classification Search
CPC ..... H04W 88/08–88/188; H04W 92/20–92/24
See application file for complete search history.

(56) References Cited

U.S. PATENT DOCUMENTS

2010/0177683 A1 7/2010 Lindoff
2011/0034175 A1 2/2011 Fong et al.
(Continued)

FOREIGN PATENT DOCUMENTS

JP 2011-91785 A 5/2011
JP 2012-515472 7/2012
(Continued)

OTHER PUBLICATIONS

International Search Report dated Aug. 7, 2012 in PCT/JP2012/004066.
(Continued)

*Primary Examiner* — San Htun
(74) *Attorney, Agent, or Firm* — Oblon, McClelland, Maier & Neustadt, L.L.P.

(57) ABSTRACT

An electronic device that communicates with a plurality of base stations by Coordinated Multiple Point transmission and reception (CoMP), the base stations including at least a first base station and a second base station. The electronic device receives configuration information from the first base station, the configuration information indicating a first period of a first reference resource; and receives a second reference resource from the second base station during the first period. The first reference resource corresponds to a muted power Channel State Information-Reference Signal (CSI-RS) and the second reference resource corresponds to a non-muted power CSI-RS.

9 Claims, 20 Drawing Sheets

(51) Int. Cl.
*H04B 7/024* (2017.01)
*H04L 5/00* (2006.01)
*H04B 17/318* (2015.01)
*H04W 88/08* (2009.01)

(52) U.S. Cl.
CPC .......... *H04L 5/0035* (2013.01); *H04L 5/0051* (2013.01); *H04W 88/085* (2013.01)

(56) References Cited

U.S. PATENT DOCUMENTS

| | | | |
|---|---|---|---|
| 2011/0085460 A1 | 4/2011 | Zhang et al. | |
| 2011/0170435 A1* | 7/2011 | Kim | H04L 5/0023 370/252 |
| 2011/0176634 A1 | 7/2011 | Yoon | |
| 2011/0305295 A1* | 12/2011 | Kim | H04L 5/0044 375/295 |
| 2012/0058791 A1* | 3/2012 | Bhattad | H04L 1/0606 455/509 |
| 2012/0106374 A1 | 5/2012 | Gaal | |
| 2012/0113951 A1 | 5/2012 | Koo | |
| 2012/0257515 A1* | 10/2012 | Hugl | H04W 24/10 370/252 |
| 2012/0281554 A1 | 11/2012 | Gao | |
| 2013/0077518 A1* | 3/2013 | Abe | H04W 48/08 370/252 |
| 2013/0114434 A1 | 5/2013 | Muruganathan et al. | |
| 2013/0176978 A1 | 7/2013 | Abe | |
| 2014/0087720 A1 | 3/2014 | Takano | |

FOREIGN PATENT DOCUMENTS

| | | |
|---|---|---|
| WO | 2010/064842 | 6/2010 |
| WO | 2010/081166 A2 | 7/2010 |
| WO | WO 2010/081166 A2 | 7/2010 |
| WO | 2010/113490 A1 | 10/2010 |
| WO | WO 2010/113490 A1 | 10/2010 |
| WO | WO 2011/010904 A2 | 1/2011 |
| WO | WO 2011/044530 A2 | 4/2011 |
| WO | WO-2011126025 A1 * | 10/2011 ............ H04W 48/08 |

OTHER PUBLICATIONS

Extended European Search Report dated Mar. 31, 2015 in Patent Application No. 12808037.1.
ZTE, "Interference coordination for control channels under non-CA based heterogeneous deployments" 3GPP TSG RAN WG1 Meeting #62 R1-104566, XP050449863, Aug. 2010, 10 Pages.
Office Action dated Sep. 29, 2015 to Japanese Patent Application No. 2011-150550, with English translation.
Office Action dated Apr. 19, 2016 to Japanese Patent Application No. 2011-150550, with English translation.
Office Action dated Dec. 5, 2016, in Chinese Patent Application No. 201280032919.8 (with English language translation).
3GPP TSG RAN WG1 Meeting #65, Barcelona, Spain, "Downlink CSI Feedback for Low-Power Nodes", May 9-13, 2011, R1-111662, Research in Motion, UK Limited.
3GPP WG1 #4, HeNB Interfernce Coordination: An Alternative to X2 R4-094633—Nov. 8-14, 2009.
3GPP TSG RAN WG2 Way forward for connected mode eICIC R2-106245—Nov. 15-19, 2010.
Japanese Office Action dated Aug. 1, 2017 in Japanese Patent Application No. 2016-143996.
3GPP TSG-RAN WG1 #64, "Further Consideration for CoMP Scenarios", 6.3.1.2, R1-110814, ZTE, Feb. 21-Feb. 25, 2011, pp. 1-4 with cover page.
TSG-RAN WG1 #65, "Discussion on CSI Feedback in Non-uniform Network", 6.3.2.2, R1-111522, ZTE, May 9-May 13, 2011, 3 Pages with cover page.
3GPP TSG-RAN WG1 #65, "Preliminary CoMP Evaluation Results for Scenarios 3 and 4", 6.3.1.2, R1-111685, Qualcomm Incorporated, May 9-May 13, 2011, pp. 1-5 with cover page.
3GPP TSG-RAN WG1 #64, "CoMP with Lower Tx Power RRH in Heterogeneous Network", 6.3.1.2, R1-110867, NTT DOCOMO, Feb. 21-Feb. 25, 2011, pp. 1-8 with cover page.

* cited by examiner

[Fig. 6]
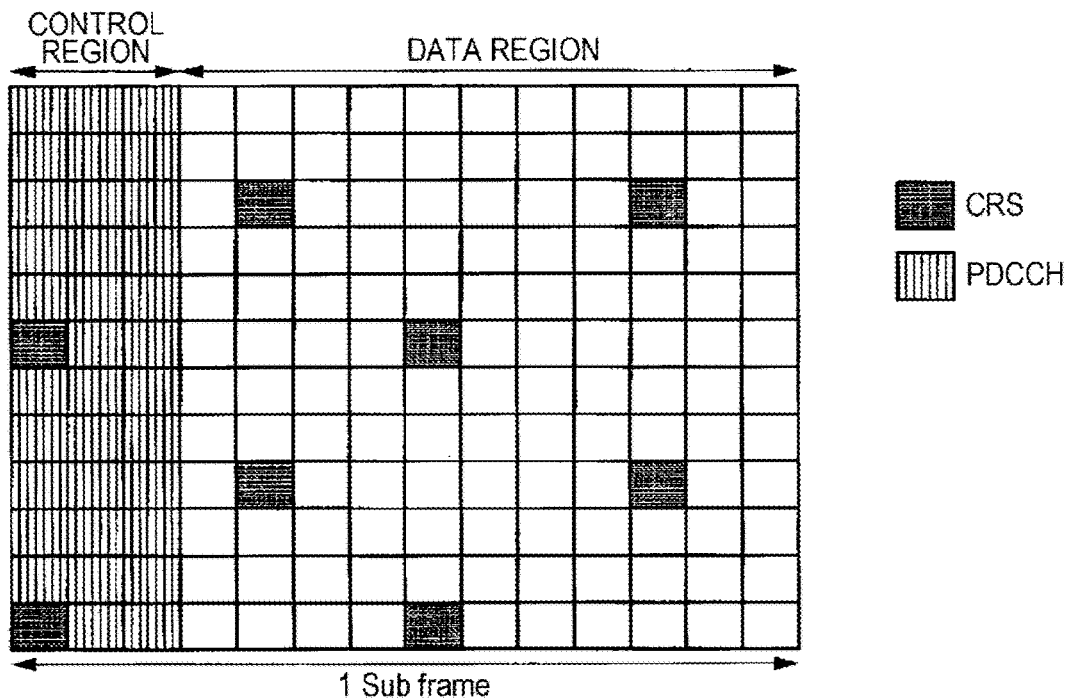
[Fig. 7]
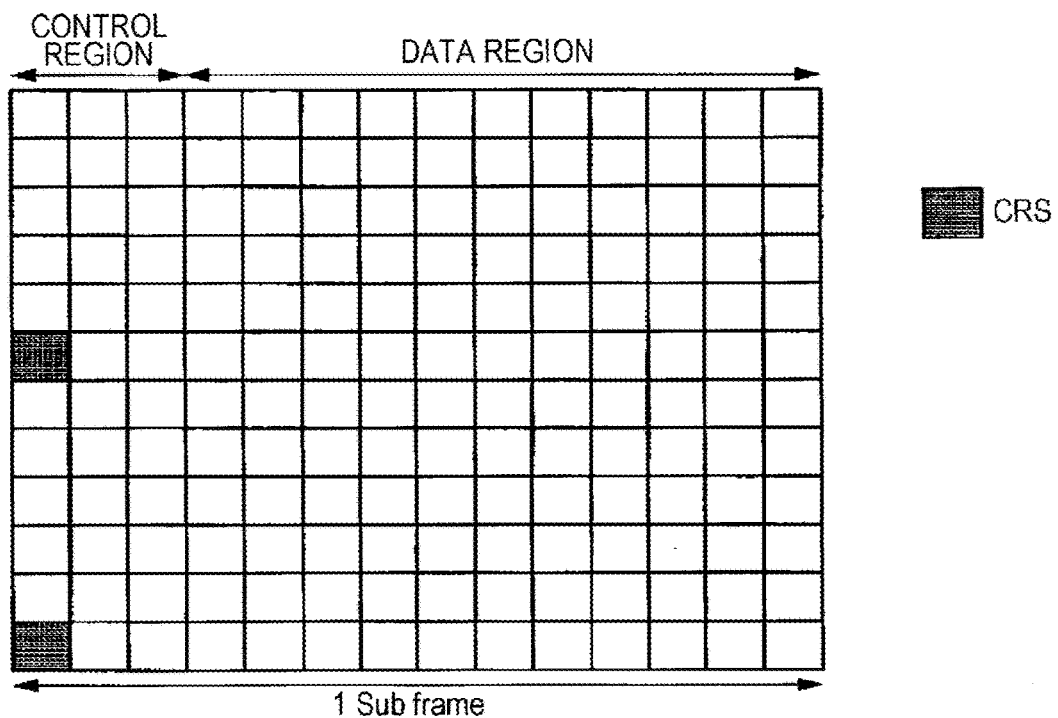

FIG. 8

| WIRELESS FRAME NUMBER | SUBFRAME NUMBER | BASE STATION WHERE ABS IS SET |
|---|---|---|
| #M TO #N | #3 | eNodeB10-1, RRH30B TO 30F |
| #N+1 TO #O | #3 | eNodeB10-1, RRH30A, RRH30C TO 30F |
| #O+1 TO #P | #3 | eNodeB10-1, RRH30A, RRH30B, RRH30D TO 30F |
| ... | ... | ... |

[Fig. 11]

| WIRELESS FRAME NUMBER | RSRP |
|---|---|
| #M TO #N | RSRP (RRH 30A) |
| #N+1 TO #O | RSRP (RRH 30B) |
| #O+1 TO #P | RSRP (RRH 30C) |
| ⋮ | ⋮ |

COMMUNICATION DEVICE AND COMMUNICATION METHOD FOR DETERMINING A COMBINATION OF BASE STATIONS USED TO COMMUNICATE WITH A COMMUNICATION TERMINAL

CROSS-REFERENCE TO RELATED APPLICATIONS

This application is a continuation application of U.S. application Ser. No. 14/123,654 filed Dec. 3, 2013, which is the U.S. National Stage application of PCT International Application No. PCT/JP2012/004066 filed Jun. 22, 2012, which claims priority to Japanese Application No. 2011-150550 filed Jul. 7, 2011. U.S. application Ser. No. 14/123,654 is herein incorporated by reference in its entirety for all purposes.

TECHNICAL FIELD

The present invention relates to a communication device, and a communication method.

BACKGROUND ART

Recently, a cellular system of fourth generation (4G) is discussed to achieve further improvements on the performance of wireless communication. In the 4G, relay technology, carrier aggregation, and Coordinated Multiple Point transmission and reception (CoMP) technology are paid attention.

The relay technology is a technology by which a relay node relays communication between a base station (for instance, a macrocell base station) and a communication terminal, and is important in improving cell-edge throughput of the base station. Moreover, the carrier aggregation is a technology that extends a usage bandwidth (for instance, 20 MHz*5=100 MHz) and achieves an improvement in maximum throughput by collectively treating a plurality of frequency bands that have a bandwidth of 20 MHz. Moreover, the CoMP is a technology by which a plurality of base stations called a CoMP set cooperates to communicate data with a communication terminal, and can expand the coverage that can support communication at high data rates. The CoMP is disclosed in Patent Document 1, for example.

Moreover, in the 4G, it is being discussed to improve the coverage by introducing base stations other than macro-eNodeBs, for example, by introducing Home eNodeBs (femtocell base stations, micro-base stations for mobile phones), remote radio heads (RRHs), and pico-eNodeBs.

CITATION LIST

Patent Literature

PTL 1: Japanese Patent Application Laid-Open No. 2011-091785

SUMMARY

Technical Problem

In this way, in a heterogeneous environment in which various kinds of base stations such as RRHs, macro eNodeBs, and the like are dispersed, it is anticipated that even the CoMP set might dynamically change. However, methods of determining the CoMP set in the heterogeneous environment are not sufficiently discussed.

Accordingly, the present disclosure proposes a novel and improved communication device, communication method, program, and communication system for appropriately determining a combination of base stations used to communicate with a communication terminal.

Solution to Problem

According to the present disclosure, provided is a communication device including a receiver that receives information indicating timing at which a predetermined signal is transmitted a transmitting base station of a plurality of base stations having the same cell ID. The receiver determines that the predetermined signal has been transmitted from the transmitting base station based on the timing observed by the receiver Moreover, according to the present disclosure, further provided is a communication method that includes receiving wirelessly at a user equipment receiver information indicating a timing at which a predetermined signal is transmitted from a transmitting base station of a plurality of base stations having a same cell ID; and determining that the predetermined signal has been transmitted from the transmitting base station based on the timing observed by said user equipment receiver.

Moreover, according to the present disclosure, yet further provided is a communication a communication controlling device and method that uses a setting unit that sets a timing at which a predetermined signal is transmitted only from some base stations of a plurality of base stations having a same cell ID so a user equipment can determine that the predetermined signal has been transmitted from a transmitting base station based on a receive timing observed by the user equipment.

Advantageous Effects of Invention

According to the present disclosure as described above, it is possible to appropriately determine a combination of base stations used to communicate with a communication terminal.

BRIEF DESCRIPTION OF DRAWINGS

FIG. 6 is an explanatory diagram illustrating a subframe which is set as an ABS.

FIG. 7 is an explanatory diagram illustrating subframes which are set as an ABS and a Multimedia Broadcast multicast Single Frequency Network (MBSFN).

FIG. 8 is an explanatory diagram illustrating an example of setting an ABS.

FIG. 11 is an explanatory diagram illustrating an example of information that is held by an RSRP holding unit.

DESCRIPTION OF EMBODIMENTS

Preferred embodiments of the present disclosure are described below in detail referring to the accompanying drawings. Throughout the present specification and drawings, components having substantially the same functional configuration are denoted by the same reference letters or numbers and thus a redundant description about such components will not be made.

Moreover, a plurality of components having substantially the same functional configuration may be distinguished sometimes by different alphabets added to the last part of the same reference letters in this specification and the drawings. For instance, a plurality of components having substantially the same functional configuration may be distinguished like RRHs 30A, 30B, and 30C if necessary. However, when a plurality of components having substantially the same functional configuration need not necessarily be distinguished from each other, such components may be denoted only by the same reference letter. For instance, when RRHs 30A, 30B, and 30C need not be necessarily distinguished from each other, they are only referred to as RRHs 30.

Moreover, the present disclosure is described in the following order of items.

1. Overall configuration of communication system
2. First embodiment
2-1. Configuration of base station
2-2. Configuration of UE
2-3. Operation of communication system
2-4. Modification
3. Second embodiment
3-1. Regarding CSI-RS
3-2. Configuration of base station
3-3. Configuration of UE
3-4. Operation of communication system
3-5. First modification
3-6. Second modification
4. Conclusion 1. Overall Configuration of Communication System The technology according to the present disclosure may be executed in various modes as described in detail, for example, in sections from "2. First embodiment" to "3. Second embodiment". Moreover, a communication device (UE 20) according to each of embodiments includes:

A. a receiver (antenna group 204 and the like) that receives information that indicates timing at which a specific signal is transmitted only from some base stations of a plurality of base stations having the same cell ID;

B. a measuring unit (DL signal detector 230) that measures reception power at the timing; and C. a transmitter (antenna group 204 and the like) that transmits the measurement result obtained by the measuring unit.

Hereinbelow, basic components that are common in respective embodiments are described first by referring to FIGS. 1 and 2.

(Overall Configuration of Communication System)

Figure 1:
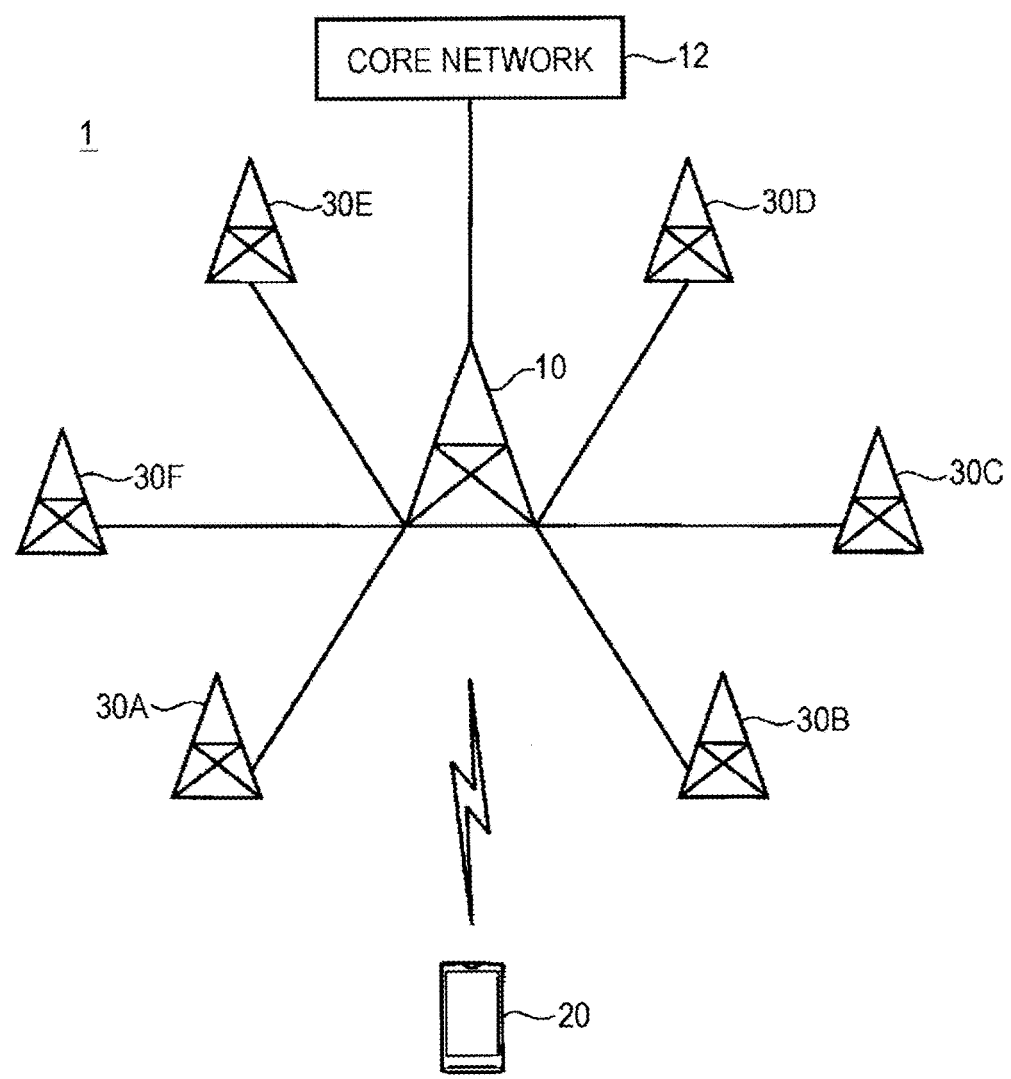
FIG. 1 is an explanatory diagram illustrating a configuration of a communication system according to an embodiment of the present disclosure.

FIG. 1 is an explanatory diagram illustrating a configuration of a communication system 1 according to an embodiment of the present disclosure. As illustrated in FIG. 1, the communication system 1 according to the embodiment of the present disclosure includes an eNodeB 10, a core network 12, a user equipment (UE) 20, and a plurality of RRHs 30A to 30F.

The UE 20 is a communication device that performs reception processing for a down-link resource block that is allocated by a base station such as the eNodeB 10, and performs transmission processing for an up-link resource block.

The UE 20 may be a smart phone shown in FIG. 1 for instance, or may be an information processing device such as a personal computer (PC), a home-use video processing device (DVD recorder, VCR, and the like), a personal digital assistants (PDA), a family-use game console, or a home electric appliance. In addition, the UE 20 may be a mobile communication device such as a mobile phone, a personal handyphone system (PHS), a portable music player, a portable video processing device, or a portable game console.

The eNodeB 10 is a radio base station that communicates with the UE 20 in the coverage (in this specification, the eNodeB 10 indicates a Macro_eNodeB unless specifically described otherwise). Moreover, the eNodeB 10 is connected to a plurality of RRHs 30A to 30F through a communication path such as an optical fiber for instance. Therefore, the eNodeB 10 can transmit a down-link signal to the RRH 30 through the communication path and cause the RRH 30 to transmit the down-link signal to the UE 20, or can receive an up-link signal, which the RRH 30 has received from the UE 20, from the RRH 30. In addition, it is also possible for the eNodeB 10 to perform CoMP communication by cooperating with the plurality of RRHs 30A to 30F. Details of the CoMP communication will be described later. Although not illustrated in FIG. 1, a lot of the eNodeBs 10 are actually connected to a core network 12.

The core network is a service-provider's network including management nodes such as a mobility management entity (MME) and a serving gateway (GW). The MME is a device that sets a session for data communication, and controls opening and hand-over. This MME is connected to the eNodeB 10 through an interface called X2. The S-GW is a device that routes and forwards user data.

The RRH 30 is a radio base station which communicates with the UE 20 with relatively small power compared with the eNodeB 10. Specifically, the RRH 30 is connected to the eNodeB 10 through a communication path such as an optical fiber and transmits the down-link signal, which has been received from the eNodeB 10 through this communication path, to the UE 20. Moreover, the RRH 30 transmits the up-link signal, which has been received from the UE 20, to the eNodeB 10 through the communication path. The communication system 1 according to the present disclosure includes the RRHs 30 so that the coverage and the quality in the vicinity of the cell edge can be improved.

(Frame Configuration)

Next, a radio frame shared between the UE 20 and a base station such as the eNodeB 10 is described.

Figure 2:
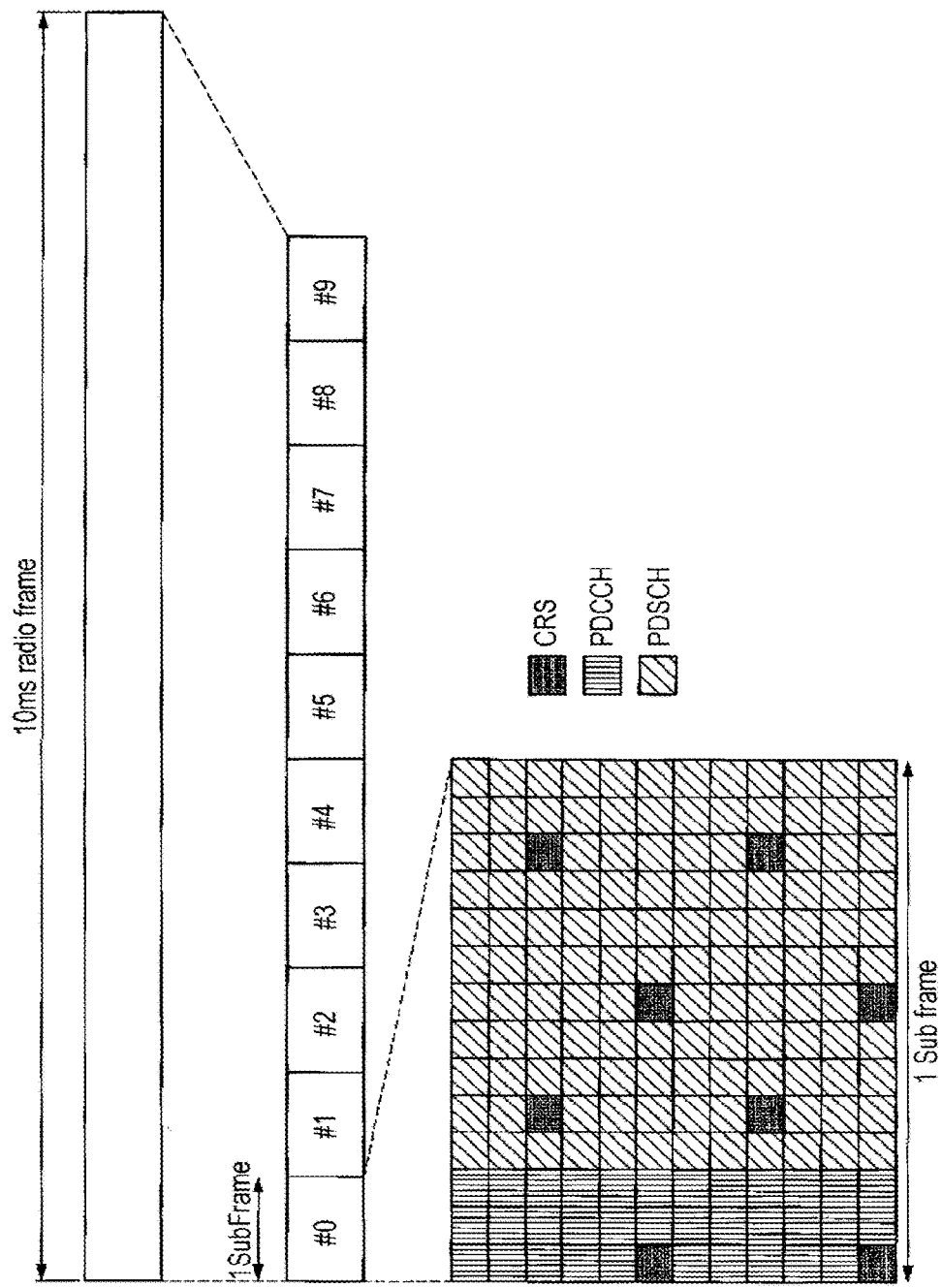
FIG. 2 is an explanatory diagram illustrating a frame format of 4G.

FIG. 2 is an explanatory diagram illustrating a frame format of 4G. As illustrated in FIG. 2, a radio frame of 10 ms includes ten subframes #0 to #9 each of which is 1 ms. Each subframe is one resource block including twelve subcarriers/fourteen orthogonal frequency division multiplexing (OFDM) symbols, and scheduling is assigned in units of a resource block. Moreover, a single OFDM symbol corresponds to a unit used in a communication system of an OFDM modulation system, and is the unit for outputting data which is processed through one time of fast Fourier transform (FFT).

Moreover, as illustrated in FIG. 2, each subframe includes a control region and a data region. The control region includes first one to three OFDM symbols (FIG. 2 shows an example in which the control region includes three OFDM symbols) and is used to transmit a control signal that is called phy downLink control channel (PDCCH). Further, the data region following the control region is used to transmit user data or the like that is called phy downLink shared channel (PDSCH).

In addition, a cell-specific common reference signal (CRS) that is a cell-specific reference signal is disposed in the control region and the data region. The UE 20 performs channel estimation by receiving this CRS, and can demodulate the PDSCH and the like on the basis of the channel estimation result.

(Regarding CoMP)

Next, the CoMP that relates to the present disclosure is described. The CoMP is a technology by which a plurality of base stations called a CoMP set cooperates to communicate data with the UE 20, and can extend the coverage which can support communication at high data rates. This CoMP is divided roughly into Joint Processing and Coordinated Scheduling and/or Beamforming.

Figure 3:
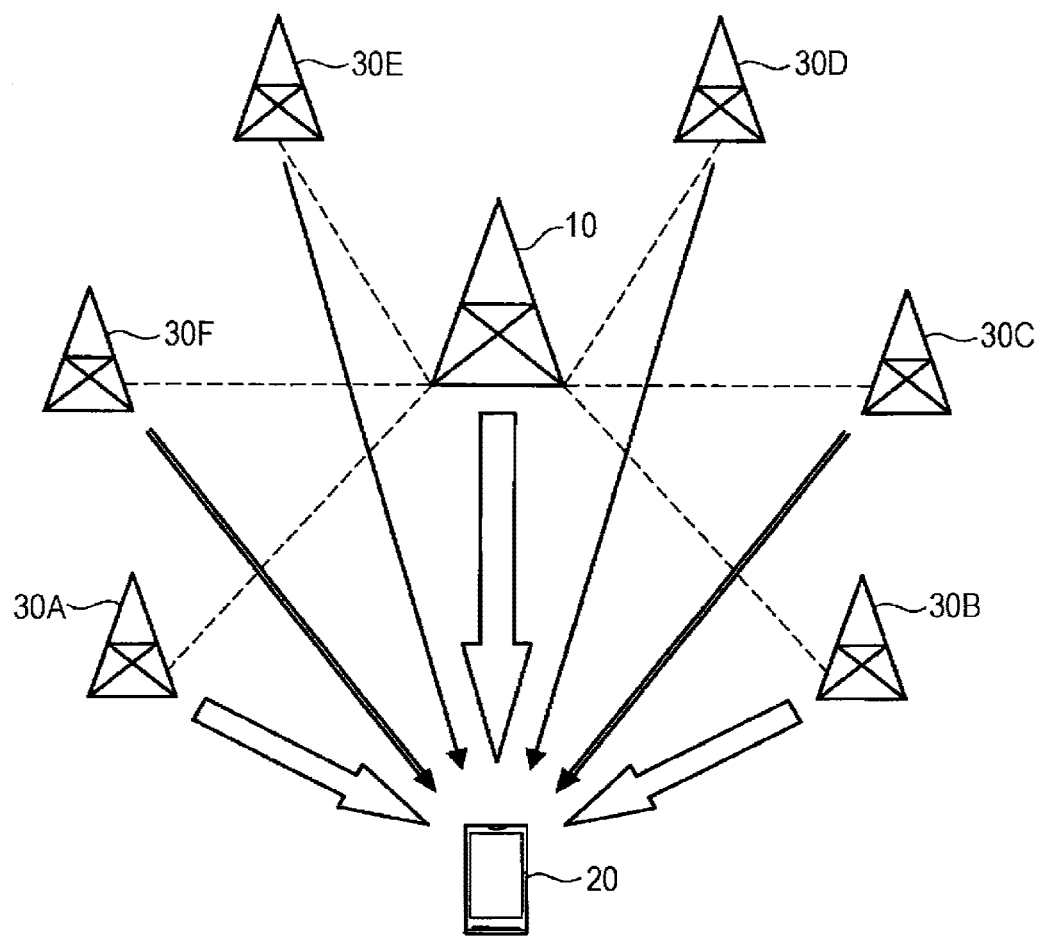
FIG. 3 is an explanatory diagram illustrating an example of an embodiment of CoMP.

The former, Joint Processing, is a technology by which a plurality of base stations communicates data with one UE 20 at the same time. For instance, as illustrated in FIG. 3, an example in which the eNodeB 10 and the RRHs 30A to 30F transmit data to the UE 20 at the same time comes under the Joint Processing. According to this Joint Processing, since branches (antennas and analog circuits (wireless processing units)) of a plurality of base stations can be used for data communication, the antenna gain and SINR can be improved.

When Joint Processing for down-link is performed, transmission data to the UE 20 should be distributed to the RRHs 30A to 30F through a wired communication path, for example, called a backing hole between the base stations beforehand. Moreover, the Joint Processing for up-link is performed by integrating the data received by a plurality of base stations from the UE 20.

Examples of the data integration method include a method of integrating data of a bit level which has been demodulated by each of the base stations, a method of integrating data of a soft bit level which has not yet been decoded by each of the base stations, a method of integrating data which has not yet been demapped by each of the base stations, and the like. As the data is integrated after latter part of the data is demodulated in each base station, the amount of data which is exchanged through the backing hall increases, but the performance tends to improve.

The latter, the Coordinated Scheduling and/or Beamforming, is a technology by which data transmission is performed only by one base station and scheduling (control that determines resource blocks to be allocated to respective UEs 20) is performed cooperatively by the plurality of base stations. According to this Coordinated Scheduling and/or Beamforming, interference among the plurality of base stations can be easily avoided by performing scheduling adjustment.

The technology according to the present disclosure especially focuses on the former, that is, Joint Processing, among the two kinds of CoMPs. This Joint Processing is roughly classified into Non-Coherent Joint Processing and Coherent Joint Processing.

The Coherent Joint Processing is an adjustment method of adjusting timing of data transmission from each of the base stations so that phases of data, which arrives at a communication terminal 20 from the respective base stations, match. On the other hand, the Non-Coherent Joint Processing is a method in which each of the base stations transmits data without adjusting timing of data transmission from each of the base stations. Therefore, the Coherent Joint Processing is superior in performance to the Non-Coherent Joint Processing. However, in order to perform the Coherent Joint Processing, it is necessary to calculate an adjustment amount of transmission timing of each of the base stations 10 for every communication terminal 20. Accordingly, it is disadvantageous in terms of complex processing.

(Regarding CoMP Set)

The CoMP set is a term used in 3GPP, and it means a combination of base stations which cooperatively perform transmission for the purpose of performing the CoMP. Usually, it is assumed that about three eNodeBs 10 compose the CoMP set. On the other hand, three or more base stations, such as five or ten, compose the CoMP set in an heterogeneous environment in which cells such as Pico_eNodeBs, Home_eNodeBs, RRH eNodeBs (in this specification, simply called RRHs), and the like are overlaid. Moreover, it is anticipated that the CoMP set dynamically changes.

By the way, since the distances to the respective base stations are different depending on the UEs 20, the best CoMP set is different for each of the UEs 20. Therefore, it is important to determine the best CoMP set for each of the UEs 20. For instance, the CoMP set can be determined in such a manner that the base stations receive the reports of reference signal received power (RSRP) of CRS that each of the UEs 20 has acquired in a frame-synchronized manner with each of the base stations and the base stations where the RSRP is large are selected from among the plurality of base stations that are reported from the UEs 20.

(Relation Between Cell ID and CoMP)

The above-mentioned Macro_eNodeBs 10 usually have cell IDs which are different for each of the Macro_eNodeBs 10. Similarly, it has been assumed for the RRHs 30 to have cell IDs different for each of the RRHs 30. However, recently, a scenario is being discussed in which the plurality of RRHs 30 that belongs to a certain Macro eNodeB 10 shares the same cell ID with the Macro_eNodeB 10. In this case, since the Macro_eNodeB 10 and the plurality of RRHs 30 transmit the same signal, there are advantages that an intercell interference of the RRHs 30 does not occur and it is easy to execute the CoMP while there is also a disadvantage that the cell gain is not improved.

(Point Aimed by this Embodiment)

Since the cell ID and the reference signal like the CRS are in one-to-one correspondence when the eNodeB 10 and all of the RRHs 30 have the same cell ID as described above, it is considered that the CRSs that are transmitted by the eNodeB 10 and each of the RRHs 30 are identical. Therefore, even if the UE 20 attempts to measure and report the RSSP of the CRS transmitted from each of the RRHs 30, it is difficult to distinguish the sending station of the CRS. Therefore, it is also difficult for the eNodeB 10 to select the best CoMP set for the UE 20. As a result, as illustrated in FIG. 3, a method is considered in which the eNodeB 10 and all of the RRHs 30 perform the CoMP with respect to the UE 20.

FIG. 3 is an explanatory diagram illustrating an example of the embodiment of the CoMP. When the eNodeB 10 and all of the RRHs 30 perform the CoMP with respect to the UE 20 as illustrated in FIG. 3, the UE 20 improves the reception quality by receiving the same signal from the eNodeB 10 and all of the RRHs 30.

However, when it is discussed in detail, the signal transmissions from the RRHs 30D and 30E do not really contribute to the improvement of the reception quality of the UE 20 because the reception power from the RRHs 30D and 30E that are far from the UE 20 is low. The signal transmissions from the RRHs 30D and 30E act as an interference wave and thus is considered to cause degradation of the throughput of the entire system.

Figure 4:
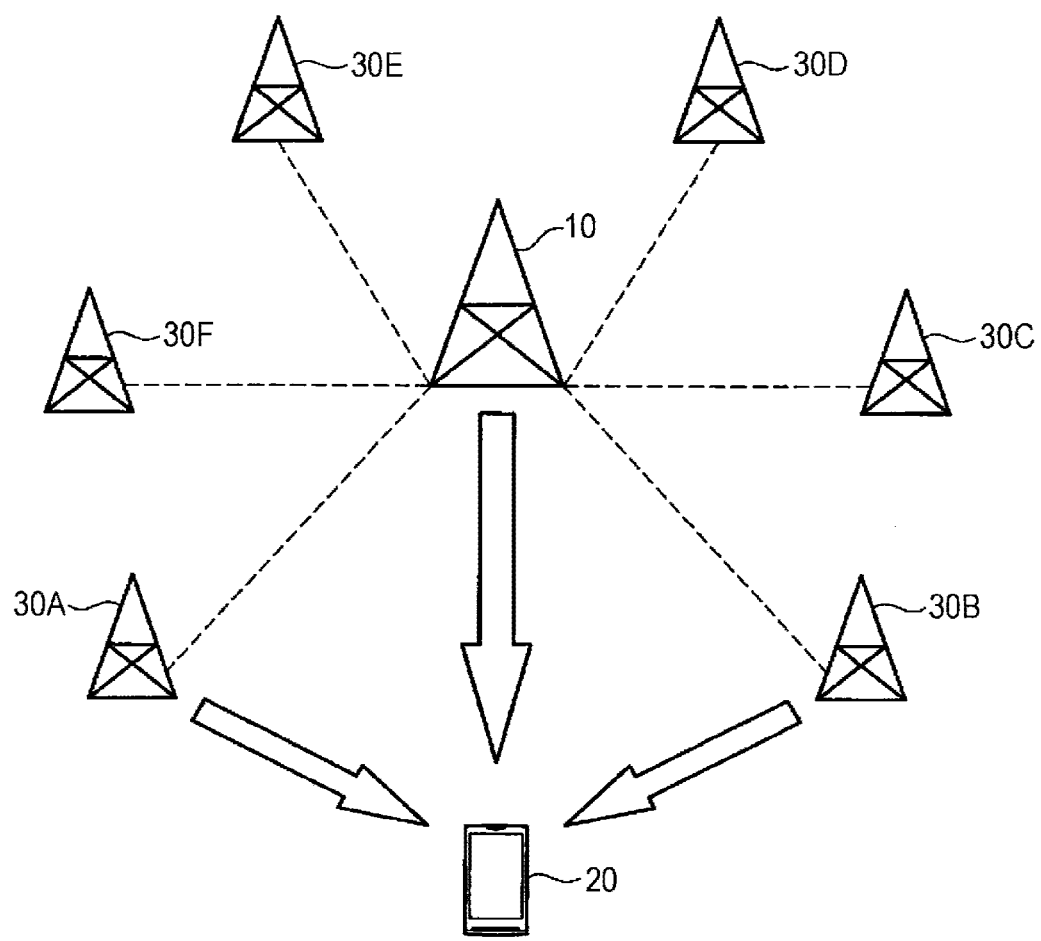
FIG. 4 is an explanatory diagram illustrating another example of the embodiment of the CoMP.

Therefore, ideally as illustrated in FIG. 4, it is preferable that the CoMP be performed by using only a part of the RRHs 30 (for instance, RRHs 30A and 30B) that contribute to the improvement of the reception quality of the UE 20. However, there was no means to select the best CoMP set for the UE 20 as described above. In this respect, since the conventional UEs of Rel8, Rel9, and Rel10 expect the same signal to be transmitted from each of the RRHs, if the respective RRHs 30 transmit signals by which the respective RRHs can be distinguished while the respective RRHs 30 have the same cell ID, the compatibility may be lost.

Therefore, in view of the above-mentioned circumstances, each embodiment of the present disclosure has been made. According to each embodiment of the present disclosure, the best CoMP set for the UE 20 can be determined by obtaining the RSRP of each of the RRHs 30 in the UE 20. Hereinbelow, each embodiment of the present disclosure is described in detail as follows.

2. First Embodiment (2-1. Configuration of Base Station)

Figure 5:
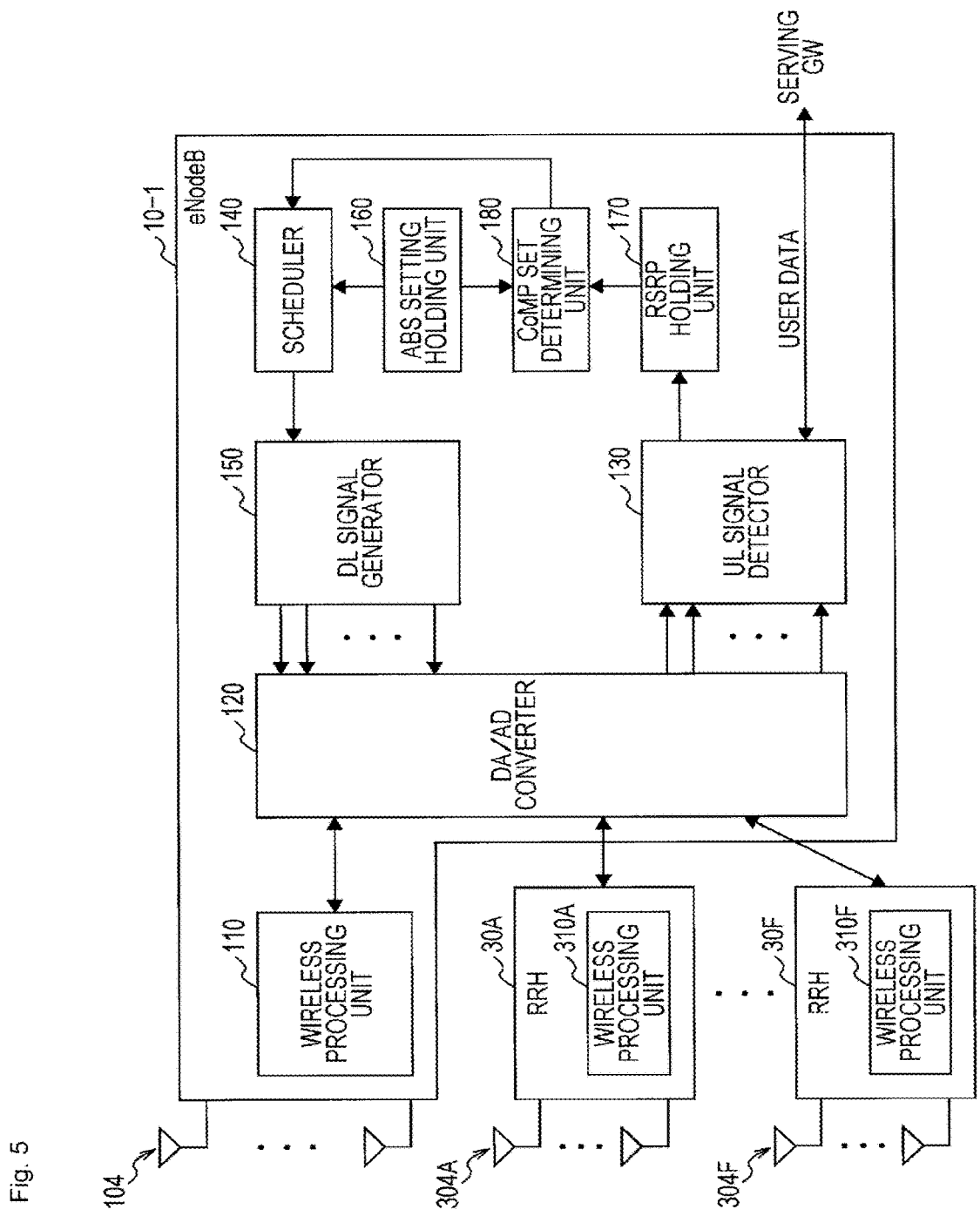
FIG. 5 is a functional block diagram illustrating configurations of an eNodeB and an RRH according to a first embodiment.

FIG. 5 is a functional block diagram illustrating configurations of an eNodeB 10-1 and RRHs 30 according to a first embodiment. As illustrated in FIG. 5, each of the RRHs 30 includes an antenna group 304 and a wireless processing unit 310, and transmits a down-link signal, supplied by the eNodeB 10-1 through an optical fiber, to a UE 20-1 according to the first embodiment. Moreover, each of the RRHs 30 supplies an up-link signal received from the UE 20-1 to the eNodeB 10-1 through the optical fiber. Each of the RRHs 30 has the same cell ID as the eNodeB 10-1, and transmits the same cell-specific reference signal (for instance, CRS).

Moreover, as illustrated in FIG. 5, the eNodeB 10-1 includes an antenna group 104, a wireless processing unit 110, a DA/AD converter 120, an up-link (UL) signal detector 130, a scheduler 140, a down-link (DL) signal generator 150, an ABS setting holding unit 160, an RSRP holding unit 170, and a CoMP set determining unit 180. Almost blank subframe (ABS) is a technology that is decided to be adopted in Rel10 of 3GPP, and the ABS is a subframe most of which is stopped from being transmitted. For instance, only PDCCH and CRS are transmitted in a subframe which is set as the ABS. The first embodiment is made by paying attention to the ABS.

The antenna group 104 receives a radio signal from the UE 20-1, acquires an electric high frequency signal, and supplies the high frequency signal to the wireless processing unit 110. Moreover, the antenna group 104 transmits the radio signal to the UE 20-1 on the basis of the high frequency signal supplied from the wireless processing unit 110. Since the eNodeB 10-1 includes the antenna group 104 including a plurality of antennas, the eNodeB 10-1 can perform MIMO communication and diversity communication.

The wireless processing unit 110 converts a high frequency signal supplied by the antenna group 104 to a baseband signal (up-link signal) by performing analog processing such as amplification, filtering, or down conversion. Moreover, the wireless processing unit 110 converts the baseband signal (down-link signal) supplied by the DA/AD converter 120 into the high frequency signal.

The DA/AD converter 120 converts the up-link signal of an analog format supplied from the wireless processing unit 110 into a digital format, and supplies the converted signal to the UL signal detector 130. Moreover, the DA/AD converter 120 converts the down-link signal of the digital format supplied from the DL signal generator 150 into the analog format, and supplies the converted signal to the wireless processing unit 110.

Moreover, the down-link signals for the respective RRHs 30 are supplied to the DA/AD converter 120 from the DL signal generator 150. Therefore, the DA/AD converter 120 converts the down-link signal for each of these RRHs 30 into the analog format, and supplies the converted signal to the corresponding RRH 30 through the optical fiber. The DA/AD converter 120 is supplied with the up-link signal from each of the RRHs 30 through the optical fiber, converts the up-link signal into the digital format, and supplies the converted signal to the UL signal detector 130.

The UL signal detector 130 detects a control signal such as PUCCH or user data such as PUSCH from the up-link signal supplied by the DA/AD converter 120. In particular, the UL signal detector 130 according to this embodiment detects an RSRP measurement result obtained through CRS measurement in the UE 20-1 from the up-link signal supplied by the DA/AD converter 120. The RSRP measurement result may be included in the PUSCH.

The scheduler 140 schedules resources to be used by the eNodeB 10-1, each of the RRHs 30, and the UE 20-1 for communication. In particular, the scheduler 140 according to this embodiment performs scheduling on the basis of the base station (the eNodeB 10-1 or each of the RRHs 30) where the ABS is set by the ABS setting holding unit 160 and a position of the subframe. Moreover, the scheduler 140 schedules the communication with the UE 20-1 by using the CoMP set for the UE 20-1 which is determined by the CoMP set determining unit 180.

The DL signal generator 150 generates the down-link signal to be transmitted from the eNodeB 10-1 and each of the RRHs 30. Specifically, the DL signal generator 150 generates PDCCH, PDSCH, and the like according to the scheduling by the scheduler 140. In addition, the DL signal generator 150 according to this embodiment sets the position of the subframe, which is specified by the ABS setting holding unit 160 as the ABS, in the ABS for the eNodeB 10-1 and each of the RRHs 30. Moreover, the PDCCH or PDSCH may contain information on the ABS which is set by the ABS setting holding unit 160. Hereinbelow, the subframe which is set as the ABS is described in detail referring to FIGS. 6 and 7.

FIG. 6 is an explanatory diagram illustrating a subframe which is set as an ABS. In the subframe which is set as the ABS as illustrated in FIG. 6, the PDSCH is not transmitted in a data region. On the other hand, transmission of the PDCCH and the CRS (reference signal) is not stopped in the data region.

FIG. 7 is an explanatory diagram illustrating a subframe which is set as both an ABS and a multimedia broadcast multicast single frequency network (MBSFN). As illustrated in FIG. 7, all transmissions except a transmission of a CRS can be stopped in the control region by setting both the ABS and the MBSFN to the subframe. In this embodiment, as described in detail later, the ABS and the MBSFN are set in the eNodeB 10-1 and each of the RRHs 30 so that the RSRPs of the respective RRHs 30 can be obtained in the UE 20-1.

Here, returning to the description about the configuration of the eNodeB 10-1 with reference to FIG. 5, the ABS setting holding unit 160 sets the ABS (which may contain the MBSFN, the same hereinbelow) with respect to at least part of subframes of the eNodeB 10-1 and the RRHs 30A to 30F. The ABS setting holding unit 160 associates and holds information that indicates the subframe set as the ABS and information that indicates the base station where the ABS is set.

The ABS setting holding unit 160 sets the same subframe as the ABS in the base stations except one base station, or except two or more base stations among the eNodeB 10-1 and the RRHs 30A to 30F. As a result, in the subframes that are set as the ABS, only one base station or only two or more base stations will transmit a CRS in the data region. Hereafter, setting of such an ABS is described more specifically referring to FIGS. 8 to 10.

FIG. 8 is an explanatory diagram illustrating an example of setting the ABS. When a subframe #3 of radio frames #M to #N is set as the ABS in the eNodeB 10-1 and the RRHs 30B to 30F excluding the RRH 30A as illustrated in the first row of FIG. 8, only the RRH 30A transmits the CRS in the data region of the subframe #3 of the radio frames #M to #N as illustrated in the upper part of FIG. 9.

Figure 9:
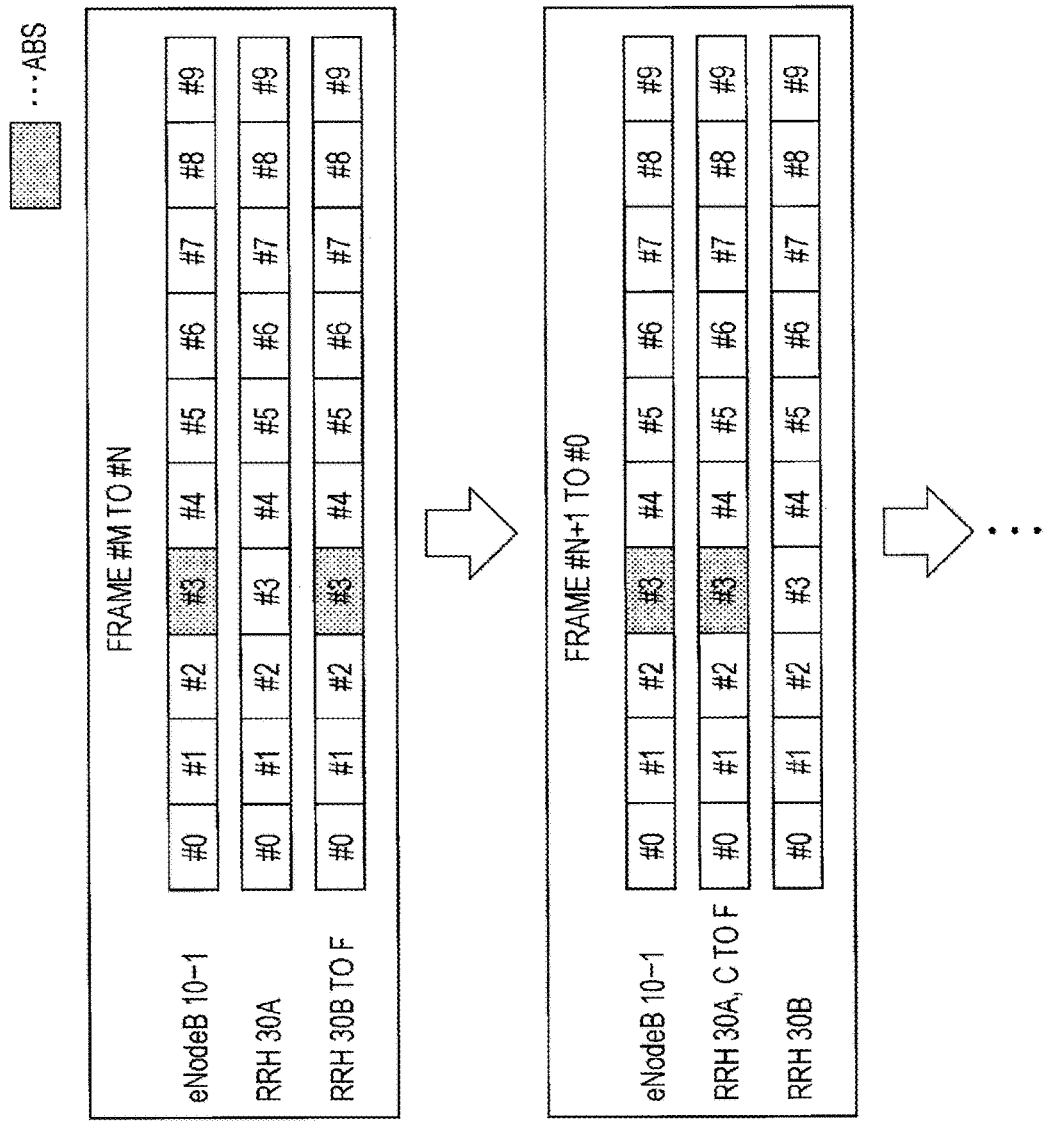
FIG. 9 is an explanatory diagram illustrating another example of setting an ABS.

Similarly, when the subframe #3 of the radio frames #N+1 to #O is set as the ABS in the eNodeB 10-1, the RRH 30A, and the RRHs 30C to 30F excluding the RRH 30B as illustrated in the second row of FIG. 8, only the RRH 30B transmits the CRS in the data region of the subframe #3 of the radio frames #N+1 to #O as illustrated in the lower part of FIG. 9. By repeating such a setting, it is possible to generate the subframes with the data region in which only each of the RRHs 30A to 30F can transmit the CRS.

Although the example of setting the ABS excluding only one RRH 30 has been described above, this embodiment is not limited to the example. For instance, the ABS setting holding unit 160 may group the eNodeB 10-1 and the RRHs 30A to 30F into two or more base station groups, and the ABS may be set excluding some base station groups. Hereafter, it will be described specifically referring to FIG. 10.

Figure 10:
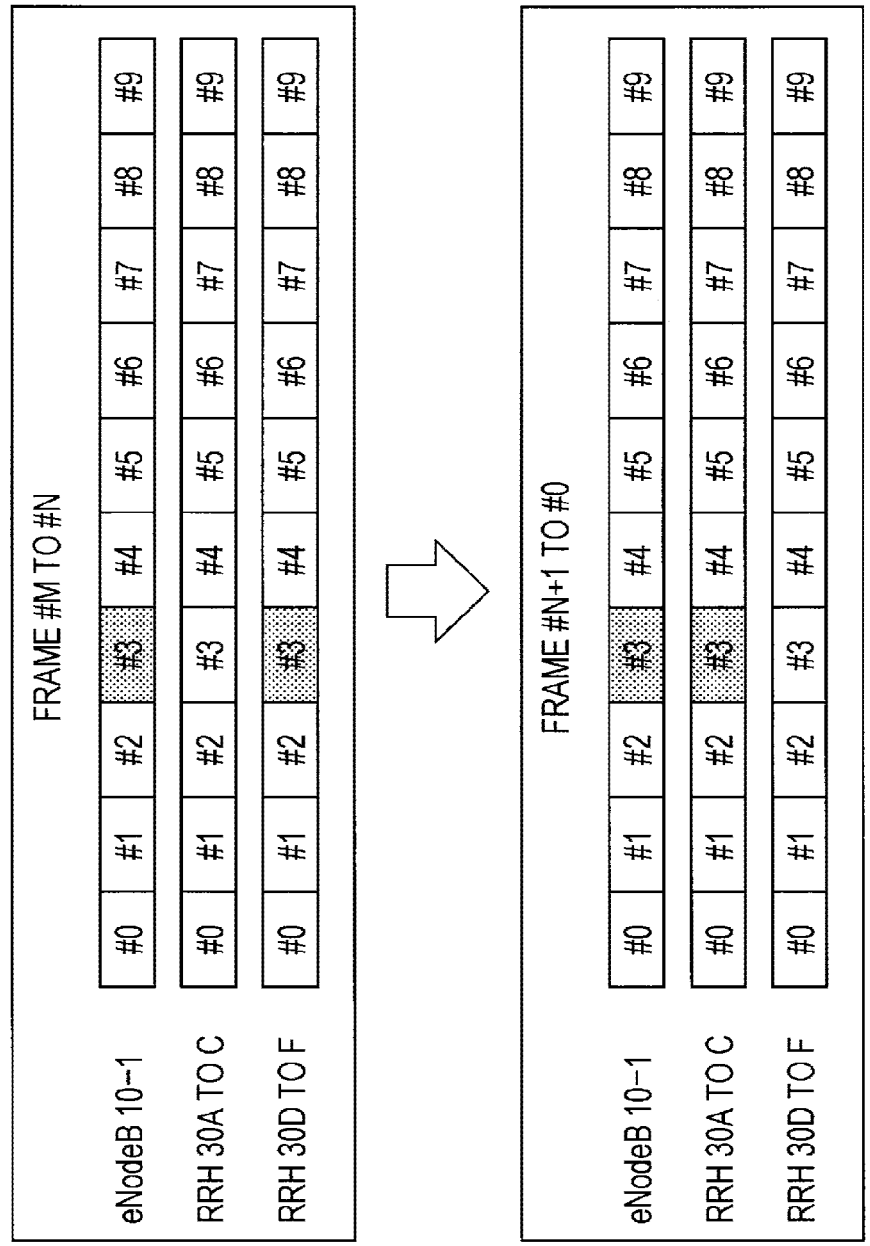
FIG. 10 is an explanatory diagram illustrating an example of setting an ABS when base stations are grouped.

FIG. 10 is an explanatory diagram illustrating an example of setting the ABS when base stations are grouped. As illustrated in FIG. 10, the ABS setting holding unit 160 may group the RRHs 30A to 30F into a base station group including the RRHs 30A to 30C and a base station group including the RRHs 30D to 30F. In this case, the ABS setting holding unit 160 can cause only the base station group including the RRHs 30A to 30C to transmit the CRS in the data region of the subframe #3 by setting the subframe #3 of the radio frames #M to #N as the ABS for the eNodeB 10-1 and the base station group including the RRHs 30D to 30F.

Similarly, as illustrated in the lower part of FIG. 10, the ABS setting holding unit 160 can cause only the base station group including the RRHs 30D to 30F to transmit the CRS in the data region of the subframe #3 by setting the subframe #3 of the radio frames #N+1 to #O as the ABS for the eNodeB 10-1 and the base station group including the RRHs 30A to 30C. As a result, though details will be described later, it is possible to determine the base station group where the RSRP measurement result in the UE 20-1 is excellent as a CoMP set.

In addition, the ABS setting holding unit 160 may set the ABS such that the base station group where the RSRP measurement result in the UE 20-1 is excellent is distinguished first and then the RSRPs of the respective RRHs 30 that compose the corresponding base station group can be acquired. According to this configuration, since the RRHs 30 where the RSRP in the UE 20-1 is excellent can be specified in stages, such a configuration is effective in terms of the time required and efficiency.

Here, returning to the description about the configuration of the eNodeB 10-1 in reference to FIG. 5, the RSRP holding unit 170 holds the RSRP measurement results in the UE 20-1 detected by the UL signal detector 130 in association with timings (for instance, radio frame numbers and/or subframe numbers) for measurement by the UE 20-1.

FIG. 11 is an explanatory diagram illustrating an example of information that is held by the RSRP holding unit 170. When the ABS setting holding unit 160 sets the ABS, for example, as illustrated in FIG. 8, the RSRP holding unit 170 holds information shown in FIG. 11 on the basis of the feedback from the UE 20-1. Specifically, the RSRP holding unit 170 associates and holds the radio frames #M to #N which are set as the ABS and the RSRPs measured by the UE 20-1 in the corresponding radio frames so that the CRS can be transmitted from only the RRH 30A. Similarly, the RSRP holding unit 170 associates and holds the radio frame numbers to which the ABS is set and the RSRPs measured by the UE 20-1 in the corresponding radio frames so that the CRS can be transmitted only from any one of the RRHs 30.

The CoMP set determining unit 180 determines the CoMP set for performing the CoMP with each of the UEs 20-1. Specifically, the CoMP set determining unit 180 determine which RRH 30 the RSRP in each of the radio frames which are held by the RSRP holding unit 170 is associated with by collating the RSRPs with the ABS setting information which is held by the ABS setting holding unit 160. The CoMP set determining unit 180 determines a suitable CoMP set for the UE 20-1 on the basis of the RSRP of each of the RRHs 30.

For instance, the CoMP set determining unit 180 may determine a predetermined number of the RRHs 30 from among ones where the RSRP is excellent as the CoMP set. Alternatively, the CoMP set determining unit 180 may determine the RRHs 30 where the RSRP exceeds a predetermined value as the CoMP set. In addition, the CoMP set determining unit 180 may determine the RRHs 30 selected from ones where the RSRP is excellent in a manner that the total value of RSRPs reaches a predetermined value as the CoMP set. The CoMP set may contain or may not contain eNodeB 10-1.

(2-2. Configuration of UE)

Configurations of the eNodeB 10-1 and the RRH 30 according to the first embodiment have been described hereinabove. Next, the configuration of the UE 20-1 according to the first embodiment is described.

Figure 12:
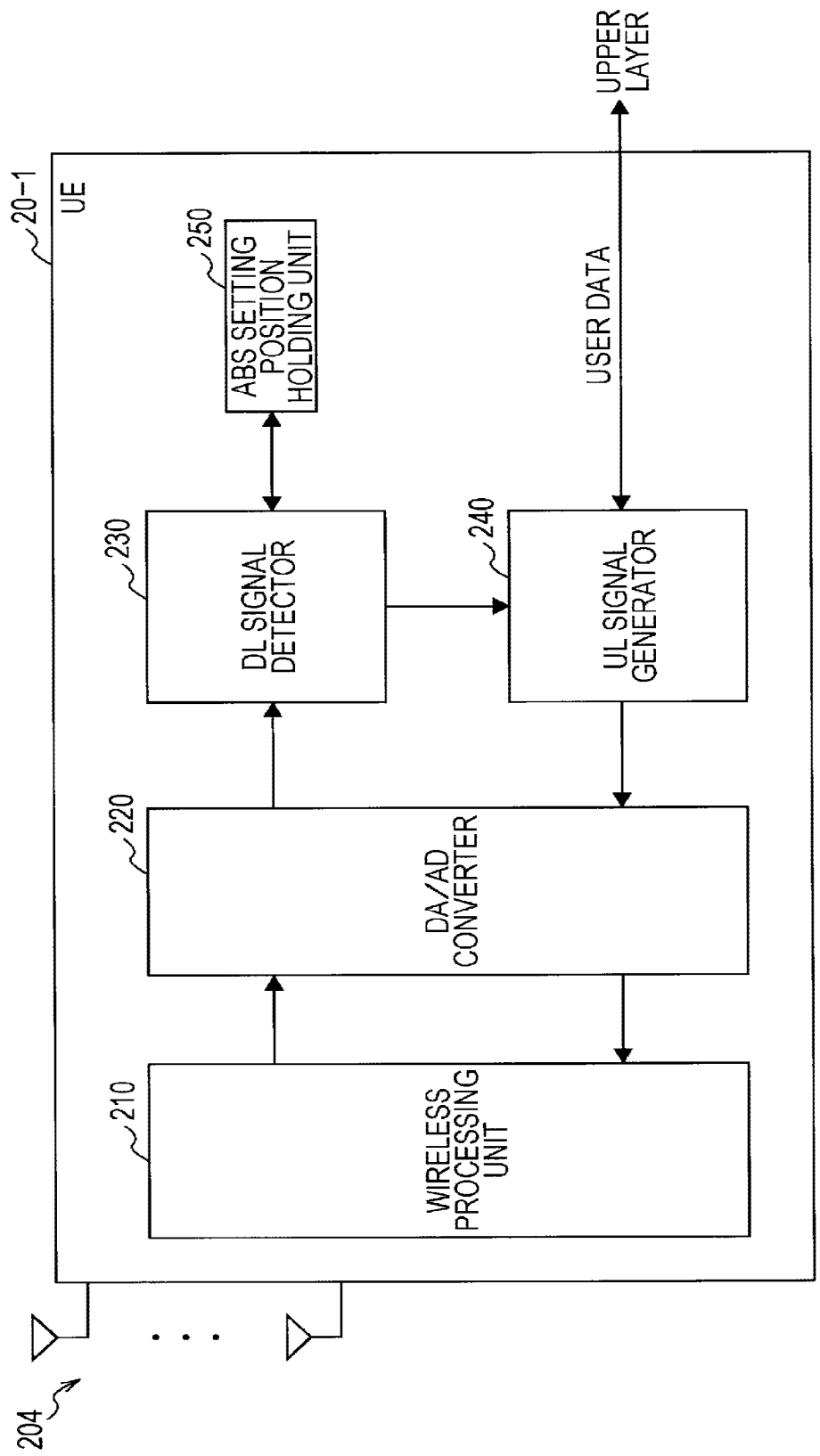
FIG. 12 is a functional block diagram illustrating a configuration of a UE according to the first embodiment.

FIG. 12 is a functional block diagram illustrating the configuration of the UE 20-1 according to the first embodiment. As illustrated in FIG. 12, the UE 20-1 includes an antenna group 204, a wireless processing unit 210, a DA/AD converter 220, a DL signal detector 230, a UL signal detector 240, and an ABS setting position holding unit 250.

The antenna group 204 receives a radio signal from the eNodeB 10-1 and the RRHs 30 to acquire an electric high frequency signal, and supplies the high frequency signal to the wireless processing unit 210. Moreover, the antenna group 204 transmits the radio signal to the eNodeB 10-1 and the RRHs 30 on the basis of the high frequency signal supplied from the wireless processing unit 210. The UE 20-1 includes the antenna group 204 including a plurality of antennas as described above so that the UE 20-1 can perform the MIMO communication or the diversity communication.

The wireless processing unit 210 converts the high frequency signal supplied by the antenna group 204 into a baseband signal (down-link signal) by performing analog processing such as amplification, filtering, or down conversion. Moreover, the wireless processing unit 210 converts the baseband signal (up-link signal) supplied by the DA/AD converter 220 into the high frequency signal. Thus, the wireless processing unit 210 cooperates with the antenna group 204 so as to function as a transmitter and a receiver.

The DA/AD converter 220 converts the down-link signal of the analog format supplied by the wireless processing unit 210 into the digital format, and supplies the converted signal to the DL signal detector 230. Moreover, DA/AD converter 220 converts the up-link signal of the digital format supplied by the UL signal generator 240 into the analog format, and supplies the converted signal to the wireless processing unit 210.

The DL signal detector 230 detects a control signal such as PDCCH, user data such as PDSCH, or the like from the down-link signal supplied by the DA/AD converter 220. In particular, the DL signal detector 230 according to this embodiment extracts information that indicates an ABS setting position from the PDCCH or the PDSCH. The information that indicates the ABS setting position corresponds to a location to measure an RSRP and is held in the ABS setting position holding unit 250. Moreover, the DL signal detector 230 functions as a measuring unit that measures the RSRP at the ABS setting position which is held in the ABS setting position holding unit 250. According to this embodiment, since only some base stations out of the eNodeB 10-1 and the RRHs 30A to 30F transmit the CRS at the ABS setting position, the DL signal detector 230 can measure the RSRP of only a part of the base stations.

The UL signal generator 240 generates an up-link signal to be transmitted to the eNodeB 10-1 and each of the RRHs 30. Specifically, the UL signal generator 240 generates a control signal like PUCCH and a user data signal like PUSCH. In particular, the UL signal generator 240 according to this embodiment generates the PUCCH or the PUSCH including the RSRP measurement result obtained by the DL signal detector 230.

(2-3. Operation of Communication System)

Hereinabove, the configurations of the eNodeB 10-1, the RRHs 30, and the UE 20-1 according to the first embodiment have been described. Next, the operation of a communication system including the eNodeB 10-1, the RRHs 30, and the UE 20-1 is described referring to FIG. 13.

Figure 13:
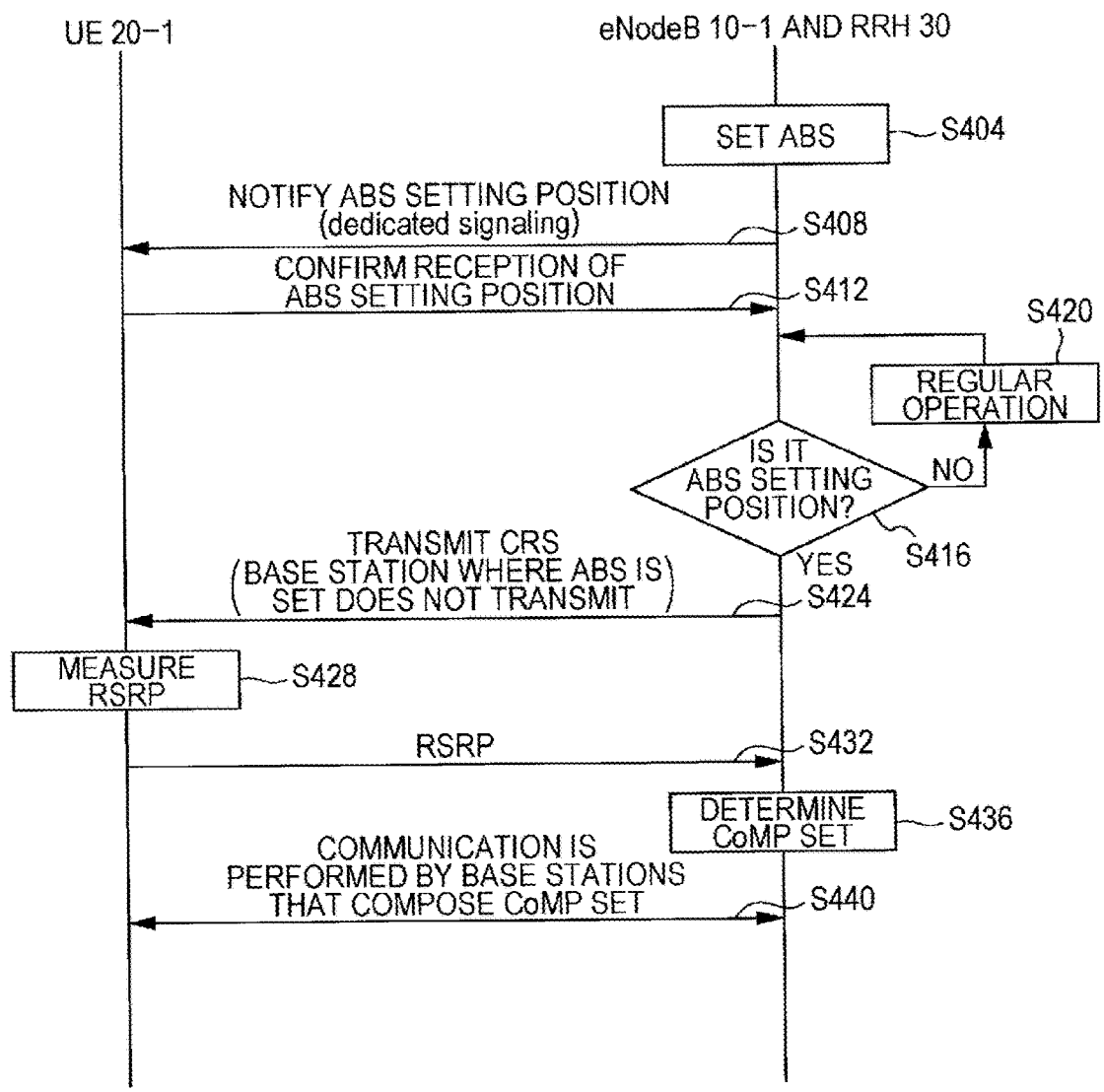
FIG. 13 is a flowchart illustrating an operation of a communication system.

FIG. 13 is a flowchart illustrating the operation of the communication system. As illustrated in FIG. 13, when the ABS setting holding unit 160 of the eNodeB 10-1 first sets the ABS (S404), the eNodeB 10-1 notifies the UE 20-1 of information that indicates the ABS setting position by dedicated signaling (S408). When the information that indicates the ABS setting position is received, the UE 20-1 transmits a receipt acknowledgement to the eNodeB 10-1 (S412).

Subsequently, the eNodeB 10-1 and the RRHs 30 perform a regular operation as usual until the ABS setting position arrives (S416, S420). Then, when the ABS setting position arrives, only the RRHs 30 where the ABS is not set transmit the CRS in the data region, but neither the eNodeB 10-1 nor the other RRHs 30 transmit the CRS in the data region (S424).

On the other hand, the UE 20-1 measures the RSRP at the ABS setting position on the basis of the information notified in S408 (S428). Then, the UE 20-1 transmits the RSRP measurement result to the eNodeB 10-1 (S432).

After that, the eNodeB 10-1 determines a suitable CoMP set for the UE 20-1 on the basis of the RSRP of each of the RRHs 30, or the RSRP of each group of the RRHs 30 when the RSRP of each of the RRHs 30 or the RSRP of each group of the RRHs 30 are completely gathered (S436). Then, the eNodeB 10-1 and the RRHs 30 that compose the determined CoMP set perform the CoMP communication with the UE 20-1 (S440). Specifically, the eNodeB 10-1 supplies the down-link signal to the RRHs 30 that compose the determined CoMP set, and the RRHs 30 that compose the CoMP set send the supplied down-link signal to the UE 20-1 in cooperation with the eNodeB 10-1. Further, if the eNodeB 10-1 supplies the down-link signal to the RRHs 30 that compose the CoMP set as described above, the down-link signal is transmitted from the corresponding RRHs 30 so that the CoMP communication can be achieved. Accordingly, the determined CoMP set is not necessarily notified to the RRHs 30.

As described above, according to the first embodiment, the RSRP in the UE 20-1 of each of the RRHs 30 can be measured even in the situation in which each of the RRHs 30 transmits the same CRS. Therefore, the eNodeB 10-1 can determine the suitable CoMP set for the UE 20-1 on the basis of the RSRP of each of the RRHs 30 in the UE 20-1.

(2-4. Modification)

Although the example where the ABS setting holding unit 160 sets the ABS to different radio frames for different RRHs 30 has been described above by referring to FIG. 9 and the like, this embodiment is not limited to the example. For instance, the ABS setting holding unit 160 may set the ABS to a plurality of subframes within the same radio frame for different RRHs 30 as described referring to FIG. 14.

Figure 14:
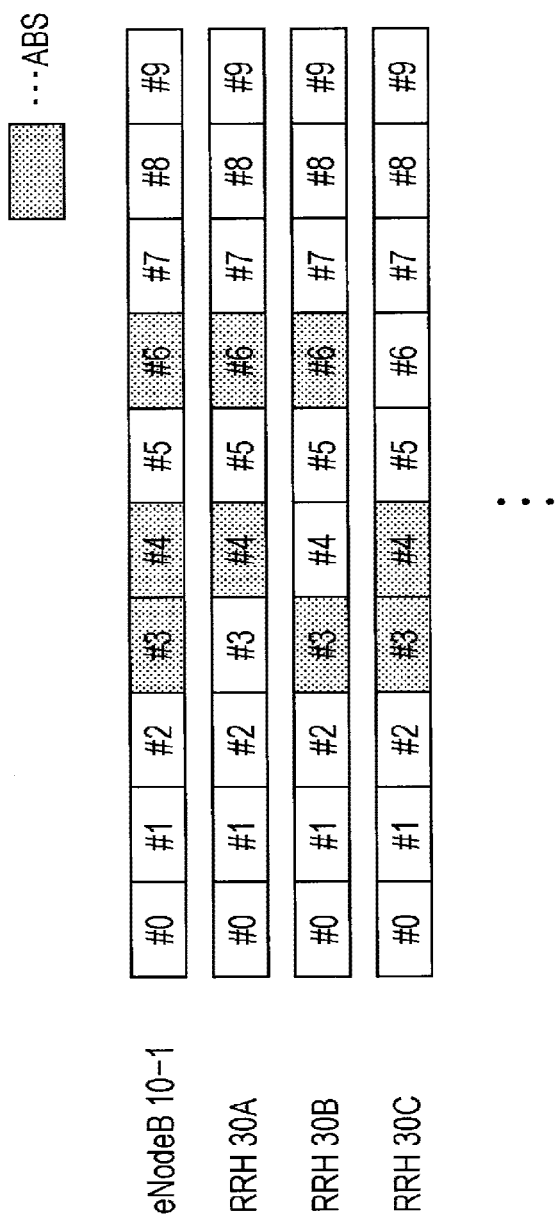
FIG. 14 is an explanatory diagram illustrating a modification of a method of setting an ABS.

FIG. 14 is an explanatory diagram illustrating a modification of the method of setting the ABS. As illustrated in FIG. 14, the ABS setting holding unit 160 may set the ABS for the base stations other than the RRH 30A in the subframes #3 of the same radio frame, and set the ABS for the base stations other than the RRH 30B in the subframe #4. In this case, since only the RRH 30A transmits the CRS in the data region of the subframe #3, the UE 20-1 can measure the RSRP of the RRH 30A in the subframe #3. Similarly, the UE 20-1 can measure the RSRP of the RRH 30B in the subframe #4.

In this modification, the UE 20-1 may report the RSRP measurement results and the subframe numbers where the RSRP is measured, in association with each other to the eNodeB 10-1 so that the eNodeB 10-1 can distinguish which RRH 30 the RSRP notified by the UE 20-1 is associated with.

Like this modification, when the ABS is set in different RRHs 30 with respect to a plurality of subframes of the same radio frame, the time to acquire the RSRPs of the respective RRHs 30 can be shortened.

3. Second Embodiment

Hereinabove, the first embodiment of the present disclosure has been described. Next, a second embodiment of the present disclosure is described. The second embodiment acquires an RSRP of each of RRHs 30 by measuring a reference signal that is called CSI-RS not by measuring the CRS that is described in the first embodiment. In the following, the CSI-RS is described first, after which details of the second embodiment are described.

(3-1. Regarding CSI-RS)

A channel state information reference signal (CSI-RS) is a reference signal defined by LTE-Advanced (Rel10). This CSI-RS is used to measure a channel quality, not for the purpose of data demodulation. Therefore, the CSI-RS is thinned out in the directions of frequency and time and inserted comparatively sparsely. For instance, an insertion period of the CSI-RS can be set within the range of about 5 ms to 80 ms like 10 ms. Since the setting of the CSI-RS (for instance, settings such as adjusting the insertion period to 5 ms or to 10 ms) can be performed for each UE, it can be said that the setting (configuration) is UE_Specific.

Moreover, as specified in Section 36.2116.10.5.1 of Rel10, a pseudo-random sequence is used for the CSI-RS. However, an initial value of the random sequence is different for each cell (cell ID). Therefore, since the CSI-RS is originally cell_specific, the base station which is a sending station of the CSI-RS can be distinguished by the UE.

However, when the respective RRHs 30 have the same cell ID, the CSI-RSs that are transmitted by the respective RRHs 30 are also identical. Moreover, although the insertion period of the CSI-RS can be set in units of a cell, when each of the RRHs 30 has the same cell ID, the CSI-RS insertion periods (timings) of the respective RRHs 30 become also identical. Therefore, it has been difficult to distinguish the RRH 30 which is a sending station of the CSI-RS measured by the UE, and to determine a suitable CoMP set for the UE.

The second embodiment of the present disclosure is a technology that is conceived by taking the above-mentioned circumstances into consideration. According to the second embodiment of the present disclosure, it is possible to distinguish the RRH 30 which is a sending station of the CSI-RS received by the UE. The second embodiment of the present disclosure is described in detail below.

(3-2. Configuration of Base Station)

Figure 15:
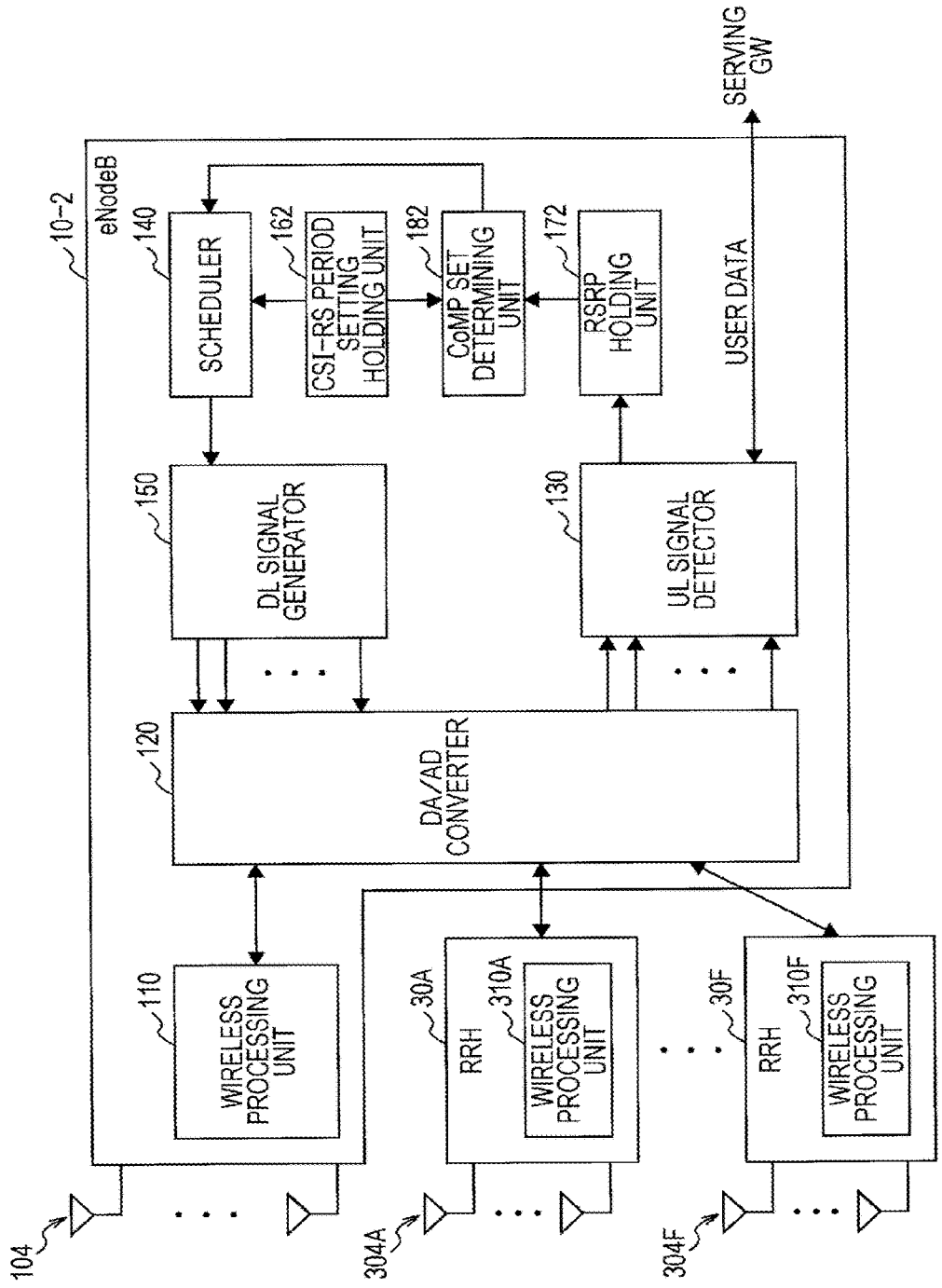
FIG. 15 is a functional block diagram illustrating configurations of an eNodeB and an RRH according to a second embodiment of the present disclosure.

FIG. 15 is a functional block diagram illustrating configurations of an eNodeB 10-2 and RRHs 30 according to the second embodiment of the present disclosure. As illustrated in FIG. 15, each of the RRHs 30 transmits a down-link signal supplied by the eNodeB 10-2 through an optical fiber to a UE 20-2 according to the second embodiment similarly to the first embodiment. Moreover, each of the RRHs 30 supplies an up-link signal received from the UE 20-2 to the eNodeB 10-2 through the optical fiber. Each of the RRHs 30 has the same cell ID as the eNodeB 10-2, and transmits the same cell-specific reference signal (for instance, CSI-RS).

Moreover, as illustrated in FIG. 15, the eNodeB 10-2 according to the second embodiment includes an antenna group 104, a wireless processing unit 110, a DA/AD converter 120, an up-link (UL) signal detector 130, a scheduler 140, and a down-link (DL) signal generator 150, a CSI-RS period setting holding unit 162, an RSRP holding unit 172, and a CoMP set determining unit 182. Since the antenna group 104, the wireless processing unit 110, and the DA/AD converter 120 have been described in the first embodiment, detailed description thereof will not be given here.

The UL signal detector 130 detects a control signal such as PUCCH and user data such as PUSCH from the up-link signal supplied by the DA/AD converter 120. In particular, the UL signal detector 130 according to this embodiment detects an RSRP measurement result obtained through a CSI-RS measurement in the UE 20-2 from the up-link signal supplied by the DA/AD converter 120. The RSRP measurement result may be contained in the PUSCH.

The scheduler 140 schedules resources to be used by the eNodeB 10-2, each of the RRHs 30, and the UE 20-2 for communication. In particular, the scheduler 140 according to this embodiment performs scheduling according to the CSI-RS insertion period set by the CSI-RS period setting holding unit 162. Moreover, the scheduler 140 schedules the communication with the UE 20-2 by using the CoMP set, which is determined for the communication with the UE 20-2 by the CoMP set determining unit 180.

The DL signal generator 150 generates the down-link signal to be transmitted from the eNodeB 10-2 and each of the RRHs 30. Specifically, the DL signal generator 150 generates PDCCH, PDSCH, and the like according to the scheduling performed by the scheduler 140. In addition, the DL signal generator 150 according to this embodiment inserts a CSI-RS into the eNodeB 10-2 and each of the RRHs 30 according to the period set by the CSI-RS period setting holding unit 162. In addition, the PDCCH or the PDSCH may contain information about the CSI-RS insertion period set by the CSI-RS period setting holding unit 162.

The CSI-RS period setting holding unit 162 sets the CSI-RS insertion period for the eNodeB 10-2 and each of the RRHs 30. For instance, the CSI-RS period setting holding unit 162 sets different insertion periods (insertion timings) for the eNodeB 10-2 and each of the RRHs 30. As a result, it is possible to specify a sending station of the CSI-RS when the UE 20-2 receives the CSI-RS at a certain timing. Hereafter, the CSI-RS insertion period is described more specifically referring to FIG. 16.

Figure 16:
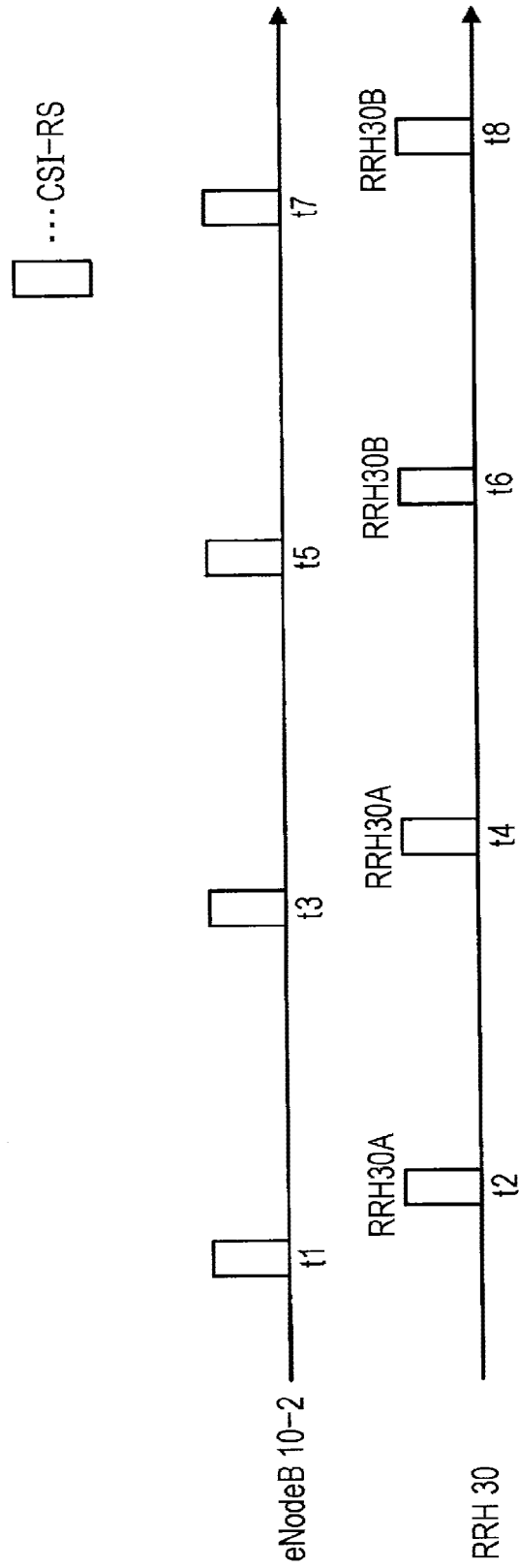
FIG. 16 is an explanatory diagram illustrating a specific example of a CSI-RS insertion period.

FIG. 16 is an explanatory diagram illustrating a concrete example of the CSI-RS insertion period. As illustrated in FIG. 16, the CSI-RS period setting holding unit 162 sets the CSI-RS insertion periods such that there may be timings at which only some base stations out of the eNodeB 10-2 and each of the RRHs 30 transmit the CSI-RS.

For instance, the CSI-RS period setting holding unit 162 sets the CSI-RS insertion periods named t1, t3, t5, and t7 for the eNodeB 10-2 as illustrated in FIG. 16, and sets the CSI-RS insertion periods named t2 and t4 for the RRH 30A. Therefore, only the RRH 30A transmits the CSI-RS for t2 and t4. Similarly, the CSI-RS period setting holding unit 162 sets the CSI-RS insertion periods named t6 and t8 for the RRH 30B. Therefore, only the RRH 30B transmits the CSI-RS for t6 and t8. Similarly, it is possible to generate timings at which only each of the RRHs 30 transmits the CSI-RS by setting CSI-RS insertion periods different from those of the eNodeB 10-2 for each of the RRHs 30.

The example of setting the CSI-RS insertion periods named t1, t3, t5, and t7 only for the eNodeB 10-2 is shown in FIG. 16, but these CSI-RS insertion periods may be set for each of the RRHs 30. In such a case, the UEs up to Rel10 receive the CSI-RSs from the plurality of RRHs 30 for the same periods named t1, t3, t5, and t7 and acquire channels without distinguishing sending stations of the respective CSI-RSs. On the other hand, the UE 20-2 down from Rel11 can receive the CSI-RSs at the timings at which only each of the RRHs 30 transmits by setting a plurality of periods as the CSI-RS reception periods. That is, the method of setting the CSI-RS according to the second embodiment can ensure compatibility with existing UEs.

Moreover, though the example of setting different CSI-RS insertion periods for each of the RRHs 30 has been described in the above-mentioned embodiment, this embodiment is not limited to the example. For instance, the CSI-RS period setting holding unit 162 may group the RRHs 30A to 30F into two or more groups, and set the same SCI-RS insertion period for the RRHs 30 that compose the same group. Hereinbelow, such a setting is described in detail referring to FIG. 17.

Figure 17:
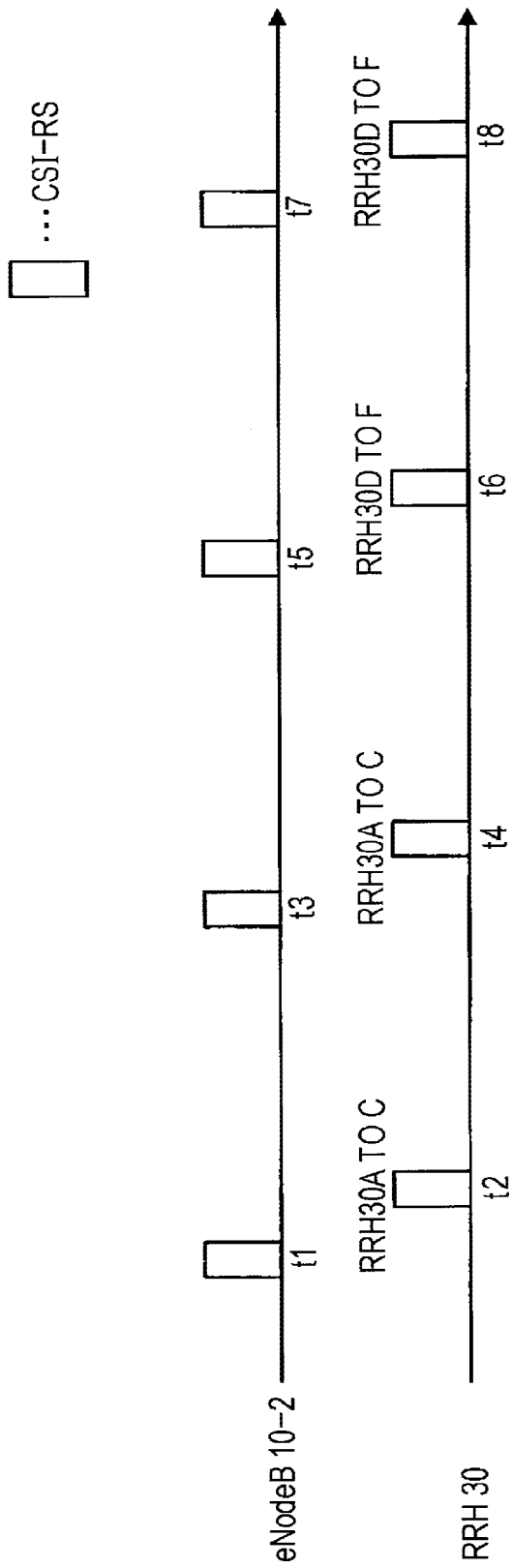
FIG. 17 is an explanatory diagram illustrating an example of setting the CSI-RS insertion period when RRHs are grouped.

FIG. 17 is an explanatory diagram illustrating an example of setting CSI-RS insertion periods when the RRHs 30 are grouped. As illustrated in FIG. 17, the CST-RS period setting holding unit 162 may group the RRHs 30A to 30F into a group including the RRHs 30A to 30C and a group including the RRHs 30D TO 30F. In this case, the CSI-RS period setting holding unit 162 can cause only the RRHs 30A to 30C to transmit the CSI-RS for t2 and t4 by setting the CSI-RS insertion periods named t2 and t4 for the group including the RRHs 30A to 30C.

Similarly, the CSI-RS period setting holding unit 162 can cause only the RRHs 30D to 30F to transmit the CSI-RS for t6 and t8 by setting the CSI-RS insertion periods named t6 and t8 for the group including the RRHs 30D to 30F. As a result, it is possible to determine the group where the RSRP measurement result in the UE 20-2 is excellent, for instance, as a CoMP set.

In addition, the CSI-RS period setting holding unit 162 may set the CSI-RS insertion periods such that the group where the RSRP measurement result in the UE 20-2 is excellent is distinguished first and then the RSRP of each of the RRHs 30 that compose the corresponding group can be achieved. According to this configuration, since the RRHs 30 where the RSRP in the UE 20-2 is excellent can be specified in stages, the configuration is effective in terms of the time required and efficiency.

Here, returning to the description about the configuration of the eNodeB 10-2 in reference to FIG. 15, the RSRP holding unit 172 holds the RSRP measurement results in the UE 20-2 detected by the UL signal detector 130 in association with timings (for instance, radio frame numbers and subframe numbers) for measurement by the UE 20-2.

The CoMP set determining unit 182 determines the CoMP set for performing the CoMP with each of the UEs 20-2. Specifically, the CoMP set determining unit 182 determines which RRH 30 the RSRP in each of the radio frames held in the RSRP holding unit 172 is associated with by collating the RSRP with setting information of each base station held in the CSI-RS period setting holding unit 162. The CoMP set determining unit 182 determines a suitable CoMP set for the UE 20-2 on the basis of the RSRP of each of the RRHs 30.

For instance, the CoMP set determining unit 182 may determine a predetermined number of the RRHs 30 from among ones where the RSRP is excellent as the CoMP set. Alternatively, the CoMP set determining unit 182 may determine the RRHs 30 where the RSRP exceeds a predetermined value as the CoMP set. In addition, the CoMP set determining unit 182 may determine, as the CoMP set, the RRHs 30 selected from among ones where the RSRP is excellent such that the total value of the RSRPs reaches a predetermined value. The CoMP set may contain or may not contain eNodeB 10-2.

(3-3. Configuration of UE)

Hereinabove, the configurations of the eNodeB 10-2 and the RRHs 30 according to the second embodiment have been described. Next, the configuration of the UE 20-2 according to the second embodiment is described.

Figure 18:
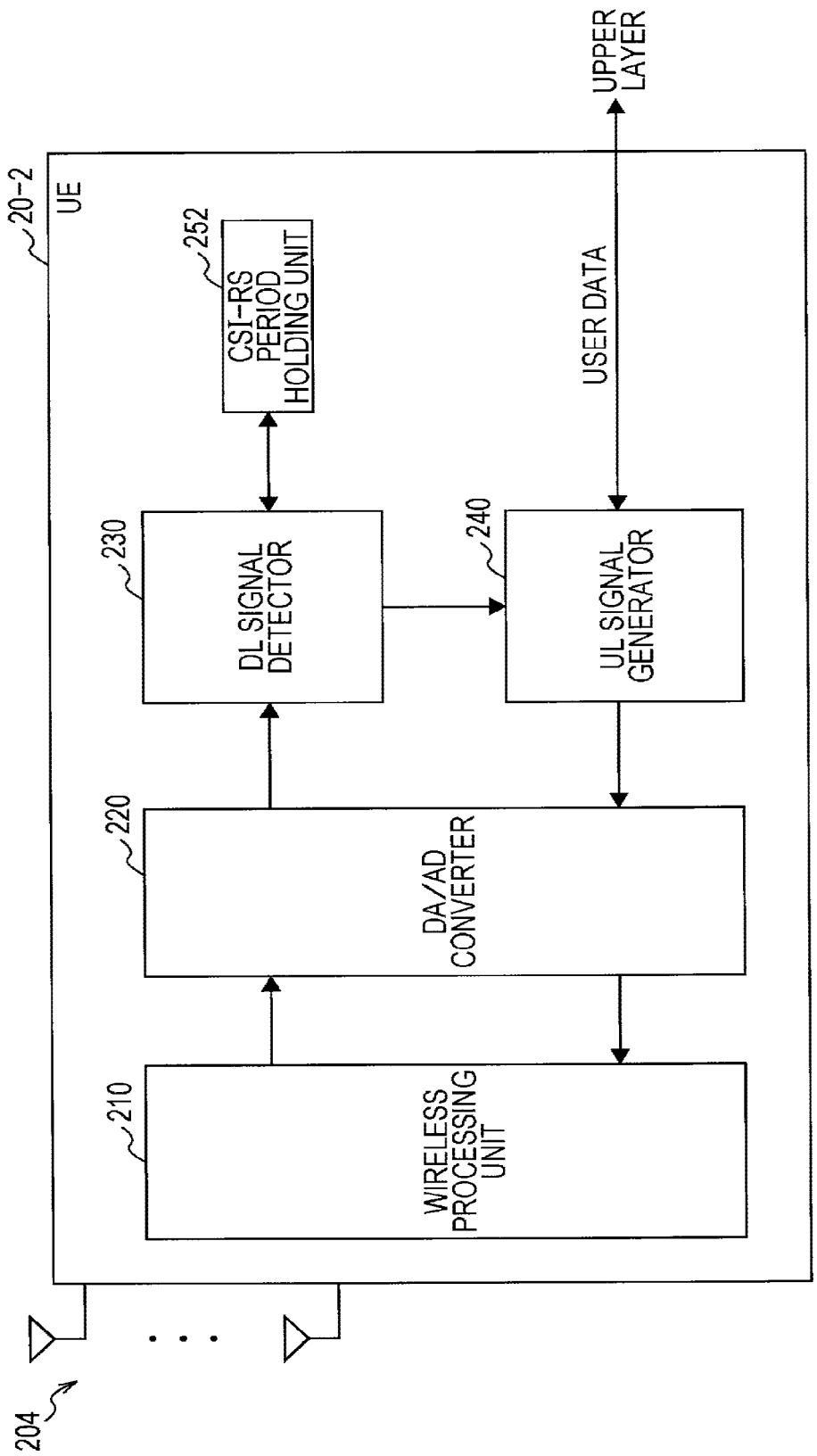
FIG. 18 is a functional block diagram illustrating a configuration of a UE according to the second embodiment.

FIG. 18 is a functional block diagram illustrating the configuration of the UE 20-2 according to the second embodiment. As illustrated in FIG. 18, the UE 20-2 includes an antenna group 204, a wireless processing unit 210, a DA/AD converter 220, a DL signal detector 230, a UL signal detector 240, and a CSI-RS period holding unit 252. Since the antenna group 204, the wireless processing unit 210, and the DA/AD converter 220 have been described in the first embodiment, a detailed description thereof is not given below.

The DL signal detector 230 detects a control signal like PDCCH and user data like PDSCH from a down-link signal supplied by the DA/AD converter 220. In particular, the DL signal detector 230 according to this embodiment extracts information that indicates the CSI-RS insertion period from the PDCCH or the PDSCH. The information that indicates the CSI-RS insertion period corresponds to a location for RSRP measurement and is held in the CSI-RS period holding unit 252. Moreover, the DL signal detector 230 measures the RSRP for the CST-RS insertion period held in the CSI-RS period holding unit 252. According to this embodiment, since only some base stations of the eNodeB 10-2 and the RRHs 30A to 30F transmit the CSI-RSs for the CSI-RS insertion periods, the DL signal detector 230 can measure the RSRPs of a part of the base stations.

The UL signal generator 240 generates an up-link signal to be transmitted to the eNodeB 10-2 and each of the RRHs 30. Specifically, the UL signal generator 240 generates a control signal like PUCCH and a user data signal like PUSCH. In particular, the UL signal generator 240 according to this embodiment generates the PUCCH or the PUSCH including the RSRP measurement result obtained by the DL signal detector 230.

(3-4. Operation of Communication System)

Hereinabove, the operations of the eNodeB 10-2, the RRHs 30, and the UE 20-2 according to the second embodiment have been described. Next, the operation of a communication system including the eNodeB 10-2, the RRHs 30, and the UE 20-2 is described referring to FIG. 19.

Figure 19:
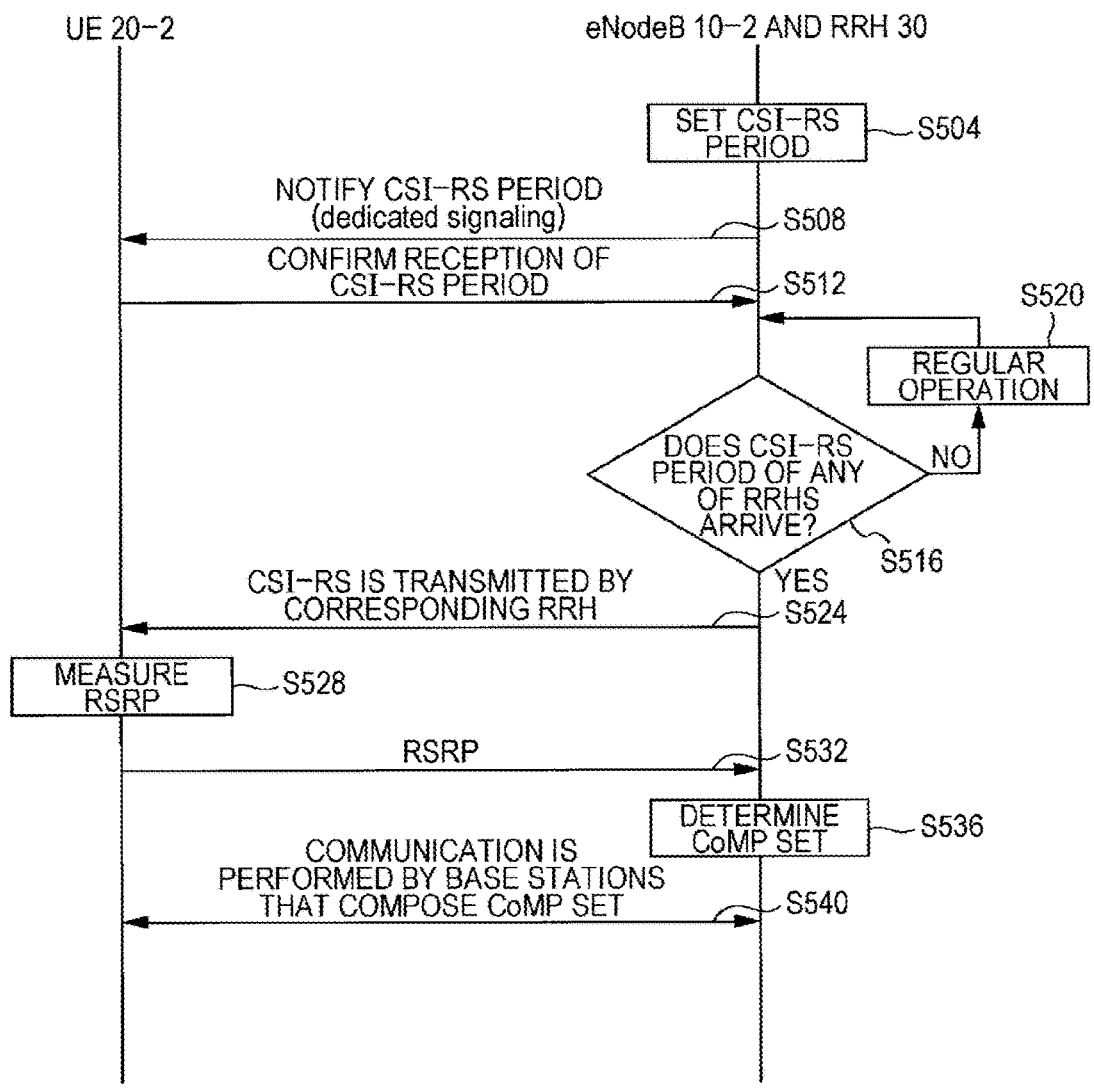
FIG. 19 is a flowchart illustrating an operation of a communication system.

FIG. 19 is a flowchart illustrating the operation of the communication system. As illustrated in FIG. 19, when the CSI-RS period setting holding unit 162 of the eNodeB 10-2 first sets a CSI-RS insertion period for each of the RRHs 30 (S504), the eNodeB 10-2 notifies the UE 20-2 of information that indicates a CSI-RS insertion period by dedicated signaling (S508). When the information that indicates the CSI-RS insertion period is received, the UE 20-2 transmits a receipt acknowledgement to the eNodeB 10-2 (S512).

After that, the eNodeB 10-2 and the RRHs 30 perform a regular operation as usual until the CSI-RS insertion period arrives (S516, 5420). When the CSI-RS insertion period arrives, the CSI-RS is transmitted only from the RRH 30 for which the coming insertion period is set (S524).

On the other hand, the UE 20-2 measures the RSRP for the CSI-RS insertion period on the basis of the information notified in S508 (S528). Then, the UE 20-2 transmits the RSRP measurement result to the eNodeB 10-2 (S532).

After that, the eNodeB 10-2 determines a suitable CoMP set for the UE 20-2 on the basis of the RSRP of each of the RRHs 30 or the RSRP of each group of the RRHs 30 when the RSRP of each of the RRHs 30 or the RSRP of each group of the RRHs 30 are completely gathered (S536). The eNodeB 10-2 and the RRHs 30 that compose the determined CoMP set perform the CoMP communication with the UE 20-2 (S540). Specifically, the eNodeB 10-2 supplies the down-link signal to the RRH 30 that composes the determined CoMP set, and the RRH 30 that composes the CoMP set transmits the supplied down-link signal to the UE 20-2 in cooperation with the eNodeB 10-2. In addition, if the eNodeB 10-2 supplies the down-link signal to the RRH 30 which composes the CoMP set as stated above, the down-link signal is transmitted from the corresponding RRH 30 so that the CoMP communication can be achieved. Accordingly, the determined CoMP set is not necessarily notified to the RRH 30.

As described above, according to the second embodiment of the present disclosure, the RSRP can be measured in the UE 20-2 of each of the RRHs 30 even in the situation in which each of the RRHs 30 transmits the same CSI-RS. Therefore, the eNodeB 10-2 can determine the COMP set that is suitable for the UE 20-2 on the basis of the RSRP of each of the RRHs 30 in the UE 20-2.

(3-5. First Modification)

Figure 20:
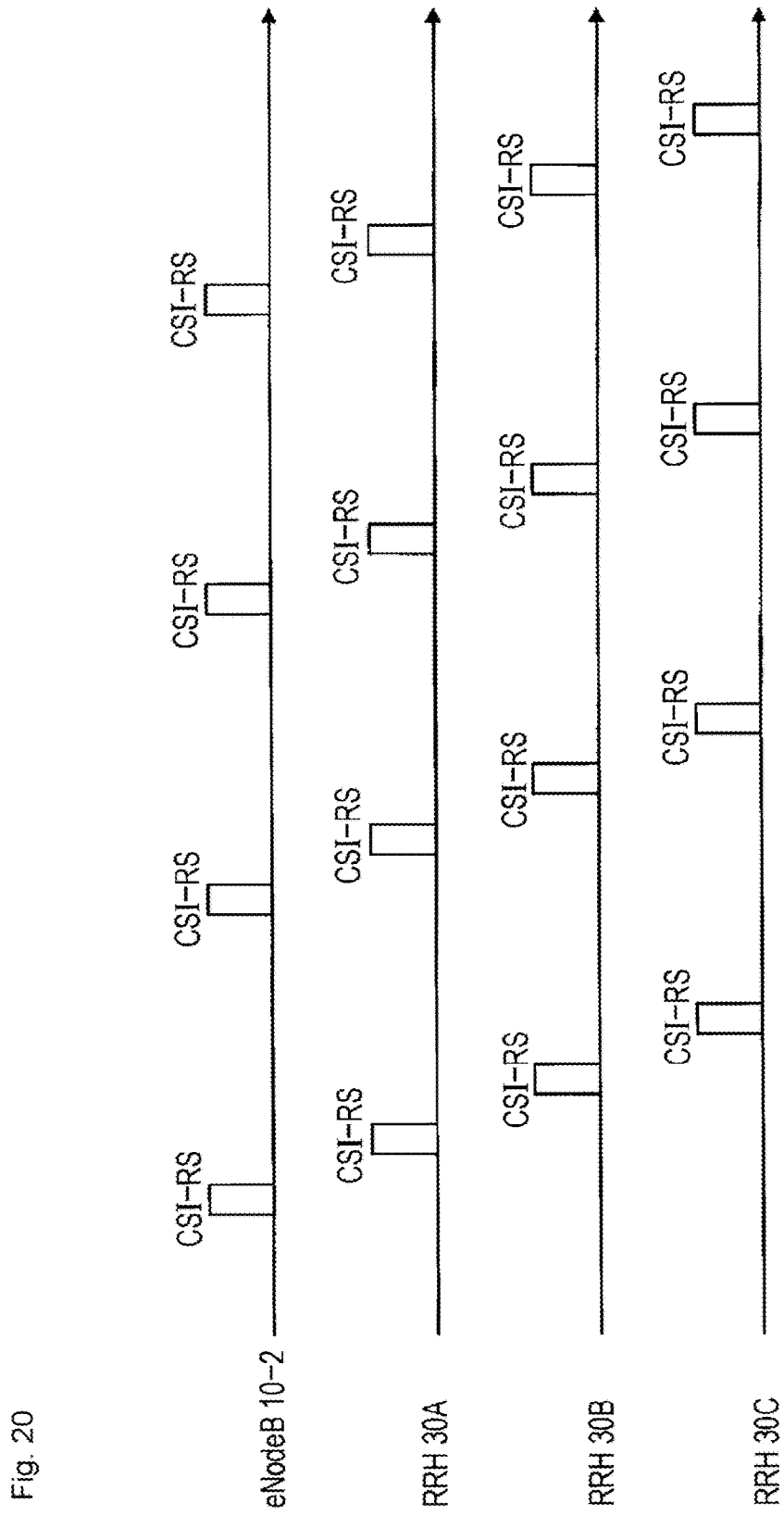
FIG. 20 is an explanatory diagram illustrating a modification of the CSI-RS insertion period.

Although the example where the CSI-RS period setting holding unit 162 sets the CSI-RS insertion period for different RRHs 30 in different time frames has been described referring to FIG. 16, but this embodiment is not limited to the example. For instance, the CSI-RS period setting holding unit 162 may set different CSI-RS insertion periods for different RRHs 30 in the time frame that overlaps as illustrated in FIG. 20.

In this case, the UE 20-2 may report RSRP measurement results and RSRP measuring periods in association with each other to the eNodeB 10-2 so that the eNodeB 10-2 can distinguish which RRHs 30 the RSRP reported from the UE 20-2 is associated with.

Like the first modification, the time to acquire the RSRP of each of the RRHs 30 can be shortened by setting different CSI-RS insertion periods for different RRHs 30 in the overlapping time frame.

(3-6. Second Modification)

By the way, the technology called CSI-RS Muting is standardized in Rel10 considering the fact that the reception of CSI-RS of the adjacent cell is disturbed by PDSCH or the like of high power from a serving base station. Muting is the technology which stops the transmission from the serving base station by using the resource block corresponding to the position from which the CSI-RS of the adjacent cell is transmitted. Actually, it is considered that the transmission of the PDSCH is stopped not only at the position from which the CSI-RS of the adjacent theory is transmitted but also at around the transmission position. In short, the CSI-RS muting is a technology which protects the CSI-RS of the adjacent cell from interference by the PDSCH of the serving base station.

Therefore, according to the second modification, the RRH 30 which is a sending station of the CSI-RS received by the UE 20-2 can be distinguished by using a method named CSI-RS+Enhanced_Muting that improves the CSI-RS muting like the second embodiment.

Specifically, the eNodeB 10-2 mutes the CSI-RSs from the RRHs 30 except a part of the RRHs 30 in the situation in which the CSI-RS insertion periods of the eNodeB 10-2 and each of the RRHs 30 are identical. As a result, since only some RRHs 30 of a plurality of RRHs 30 transmit the CST-RS, the RRH 30 which is the sending station of the CSI-RS received by the UE 20-2 can be distinguished. Hereafter, such an operation will be described in detail referring to FIG. 21.

Figure 21:
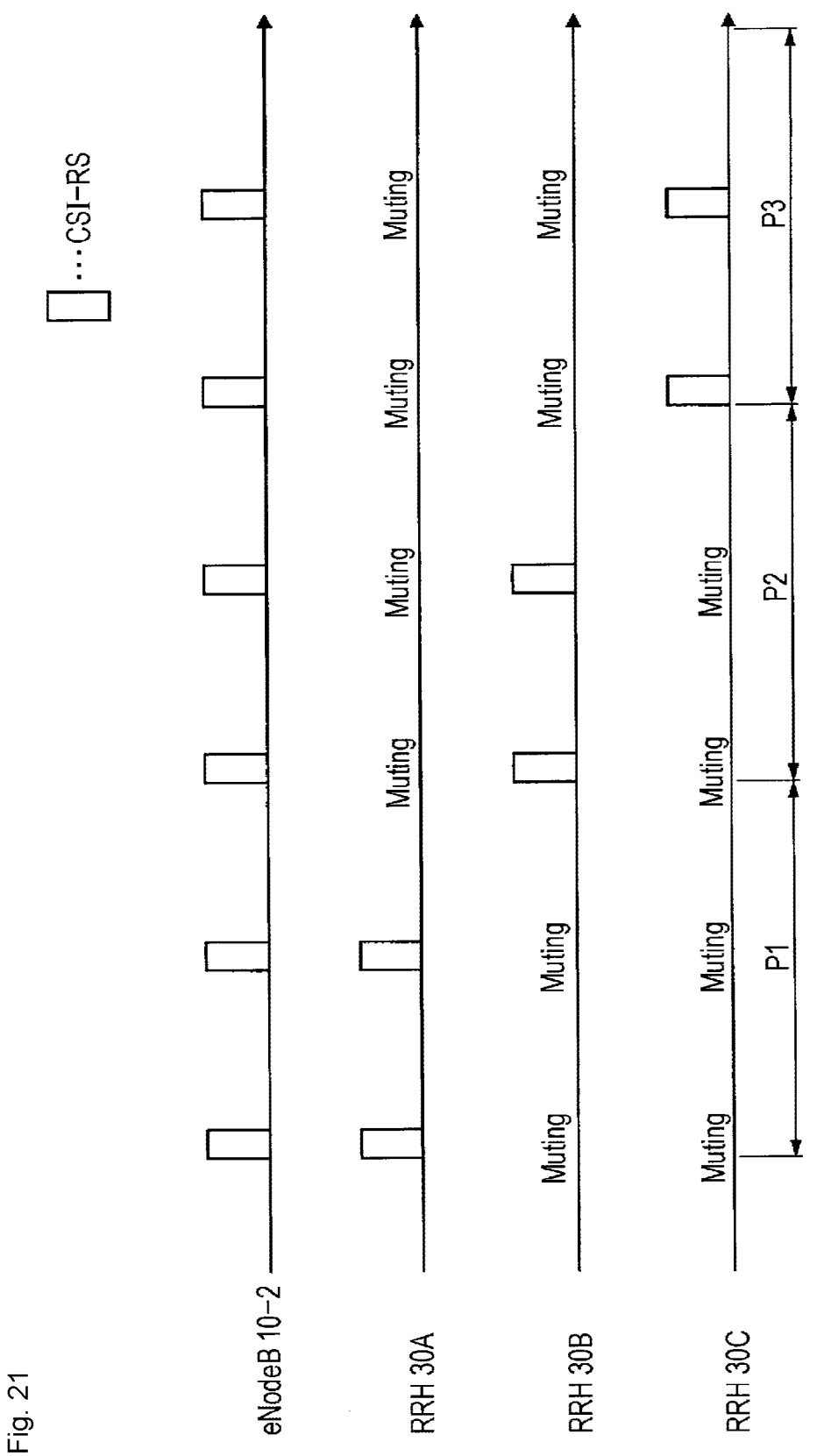
FIG. 21 is an explanatory diagram illustrating CSI-RS+Enhanced_Muting according to the second modification.

FIG. 21 is an explanatory diagram illustrating CSI-RS+Enhanced_Muting according to the second modification. As illustrated in FIG. 21, the CSI-RSs from the RRHs 30 other than the RRH 30A is muted for a period P1. Therefore, the RRH 30A can be specified as the sending station of the CSI-RS received by the UE 20-2 for the period P1.

Moreover, since the CSI-RSs from the RRHs 30 other than the RRH 30B are muted for a period P2, the RRH 30B can be specified as the sending station of the CSI-RS received by the UE 20-2 for the period P2. Moreover, since the CSI-RSs from the RRHs 30 other than the RRH 30C are muted for a period P3, the RRH 30C can be specified as the sending station of the CSI-RS received by the UE 20-2 for the period P3.

In Modification 2, the eNodeB 10-2 notifies the UE 20-2 of the period of a single CSI-RS beforehand, and the UE 20-2 may measure the RSRP for this CSI-RS period and report the measurement result to the eNodeB 10-2. As a result, the eNodeB 10-2 can determine a suitable CoMP set for the UE 20-2 on the basis of the RSRP measurement result reported from the UE 20-2.

4. Conclusion

As described above, according to the embodiments of the present disclosure, the RSRP can be measured in the UE 20 of each of the RRHs 30 even in the situation in which each of the RRHs 30 operates based on the same cell ID. Therefore, the eNodeB 10 can determine the CoMP set that is suitable for the UE 20 on the basis of the RSRP of each of the RRHs 30 in the UE 20. As a result, it is possible to achieve an improvement of system throughput and a reduction in power consumption because the transmission from the RRHs 30 that do not really contribute to the improvement of the reception quality of the UE 20 can be avoided.

Although the preferred embodiments of the present disclosure have been described in detail referring to the accompanying drawings, the technical scope of the present disclosure is not limited to the examples. It is understood that those ordinarily skilled in the technical field of the present disclosure may certainly conceive various alterations or modifications within the scope of the technical spirit described in the claims, and be aware that these naturally fall within the technical scope of the present disclosure.

For instance, although the examples of determining the CoMP set on the basis of the measurement result of the RSRP as a reference signal which is measured by the UE 20 have been described above, the technical scope of the present disclosure is not limited to the examples. As a modification, the UE 20 may feedback an index that indicates a reception quality such as an error occurrence rate of a signal sent from each of the RRHs 30 to the eNodeB 10, and the eNodeB 10 may determine the CoMP set on the basis of the index.

Moreover, each step in the processing performed by the eNodeB 10 and the UE 20 of this specification is not necessarily processed in a time series manner along the order described in the sequence diagram. For instance, each step in the processing of the eNodeB 10 and the UE 20 may be processed in order different from the order described in the sequence diagram or may be processed in parallel.

Furthermore, the second modification of the second embodiment has been described by using an example in which the RSRPs corresponding to the respective combinations of the RRHs 30 are acquired by using CSI-RS Muting, but the signals used are not limited to the CST-RS. For example, a mechanism similar to the above-described mechanism can be provided by preparing an RS other than the CSI-RS, or a new RS. Especially when a plurality of RRHs 30 (or a plurality of eNodeBs 10) sends the RS using the same resource element, the RSRPs corresponding to the respective combinations can be obtained using the same mechanism as the present technology.

Furthermore, though the CoMP set is determined by using an estimation of a desired signal and an estimation of an interference signal, the method of acquiring these estimations has not been sufficiently studied yet. Moreover, the estimation of the interference amount in CoMP environment can be used not only for the determination of the CoMP set but also as information for controlling other interferences, such as ICIC (Inter-Cell Interference Coordination) of the LTE Release 8. Accordingly, the estimation of the interference amount from each eNodeB also becomes important.

That is, the technology of the present disclosure is used not only for the purpose of acquiring a desired RSRP, but also for the purpose of acquiring an intensity of an interference component. That is, according to the technology of the present disclosure, the interference component from the base stations such as the RRHs 30 or the eNodeBs 10 that have the same cell ID can be acquired for each of different combinations of the base stations. This is implemented, for example, in a way that the UL signal detector 130 of the eNodeB 10 acquires a detection result of the interference component which is obtained from the uplink signal through RS measurement in the UE 20, and the RSRP holding unit 170 stores the detection result of the interference component. A specific method of acquiring the interference component in each of the UEs 20 is as follows: for example, a correlation with a reception signal is obtained by using an RS (Reference Signal) of each of the eNodeBs 10 as a known signal, and the interference amount of each eNodeB 10 can be acquired by using the magnitude of the correlation. It can be said that the method of acquiring the magnitude of this interference component and the method of acquiring the magnitude of the desired component among the reception signals are the same.

Moreover, it is possible to produce a computer program which causes hardware embedded in the eNodeB 10 and the UE 20, such as a CPU, a ROM, and a RAM to perform the same functions as those of the respective components of the eNodeB 10 and the UE 20 that have been described above. Moreover, a storage medium which stores the computer program is provided.

Moreover, the following configurations also belong to the technical scope of the present disclosure.

According to a communication device embodiment, the device includes a receiver that receives information indicating a timing at which a predetermined signal is transmitted from a transmitting base station of a plurality of base stations having a same cell ID, wherein said receiver determines that said predetermined signal has been transmitted from the transmitting base station based on the timing observed by said receiver.

According to one aspect of the embodiment, the communication device further includes a transmitter that transmits an indication of measurement results made by said receiver of said predetermined signal so that a subset of said plurality of base stations are assigned for future communications with said communication device based on said measurement results.

According to another aspect the receiver is configured to receive the predetermined signal from the subset of said plurality of base stations in a data portion of a predetermined subframe, and other base stations of said plurality of base stations not transmitting said predetermined signal in said predetermined subframe so that the receiver can distinguish whether the predetermined signal is from one of the subset of said plurality of base stations or from the other base stations.

According to another aspect the predetermined subframe is an almost blank subframe that includes the predetermined signal.

According to another aspect the predetermined subframe is located in different respective time slots for different base stations of the plurality of base stations.

According to another aspect the receiver is configured to measure a received signal power of said predetermined signal for each of the plurality of base stations.

According to another aspect said transmitter is configured to transmit an indication of said received signal power to the transmitting base stations for assisting in setting the subset of said plurality of base stations.

According to another aspect the receiver determines an interference component as part of said measurement result.

According to another communication device embodiment, the device includes a communication controlling device that includes a setting unit that sets a timing at which a predetermined signal is transmitted only from some base stations of a plurality of base stations having a same cell ID so a user equipment can determine that the predetermined signal has been transmitted from a transmitting base station based on a receive timing observed by the user equipment.

According to one aspect of the embodiment, the device further includes a wireless processing unit that receives a measurement result from a user equipment of said predetermined signal as received at said user equipment and assigns a subset of said plurality of base stations having a same cell ID to provide future communications with user equipment.

According to another aspect the communication controlling device sets a format of said predetermined signal to be included in a predetermined subframe transmitted from the subset of said plurality of base stations having a same cell ID.

According to another aspect the communication controlling device positions said predetermined subframe as an almost blank subframe that includes the predetermined signal.

According to another aspect the predetermined subframe is located in different respective time slots for different base stations of the plurality of base stations.

According to another aspect the wireless processing unit receives a signal from the user equipment that includes a measure of a received signal power at said user equipment of said predetermined signal transmitted from respective of the plurality of base stations.

According to another aspect said wireless processing unit receives an indication of said received signal power for assisting the communications controlling device in setting the subset of said plurality of base stations in association with a subframe number of said predetermined signal.

According to another aspect the wireless processing unit receives an interference component as part of said measurement result.

According to a method embodiment, the method includes
receiving wirelessly at a user equipment receiver information indicating a timing at which a predetermined signal is transmitted from a transmitting base station of a plurality of base stations having a same cell ID; and determining that said predetermined signal has been transmitted from the transmitting base station based on the timing observed by said user equipment receiver.

According to one aspect of the embodiment, the method further includes transmitting an indication of measurement results made by said receiver of said predetermined signal so that a subset of said plurality of base stations are assigned for future communications with said communication device based on said measurement results.

According to another aspect
the receiving includes receiving the predetermined signal from the subset of said plurality of base stations in a data portion of a predetermined subframe, and other base stations of said plurality of base stations not transmitting said predetermined signal in said predetermined subframe so that the receiver can distinguish whether the predetermined signal is from one of the subset of said plurality of base stations or from the other base stations.

According to another aspect
the predetermined subframe is an almost blank subframe that includes the predetermined signal.

According to another aspect
the predetermined subframe is located in different respective time slots for different base stations of the plurality of base stations.

According to another aspect
the receiving includes measuring a received signal power of said predetermined signal for each of the plurality of base stations.

According to another aspect
said transmitting includes transmitting an indication of said received signal power to the transmitting base stations for assisting in setting the subset of said plurality of base stations.

According to another aspect
said receiving includes determining an interference component as part of said measurement result.

According to another method embodiment, the method includes setting a timing at which a predetermined signal is transmitted only from some base stations of a plurality of base stations having a same cell ID; and transmitting said predetermined signal to a user equipment so the user equipment can determine that the predetermined signal has been transmitted from a transmitting base station based on a receive timing observed by the user equipment.

According to one aspect, the method further includes
receiving a measurement result from a user equipment of said predetermined signal as received at said user equipment and assigning a subset of said plurality of base stations having a same cell ID to provide future communications with user equipment based on said measurement result.

According to another aspect
setting a format of said predetermined signal to be included in a predetermined subframe transmitted from the subset of said plurality of base stations having a same cell ID.

According to another aspect
said setting includes setting said predetermined subframe as an almost blank subframe that includes the predetermined signal.

According to another aspect
the predetermined subframe is located in different respective time slots for different base stations of the plurality of base stations.

According to another aspect, the method further includes
receiving a signal from the user equipment that includes a measure of a received signal power of said predetermined signal from the plurality of base stations at said user equipment.

According to another aspect
said receiving includes receiving an indication of said received signal power for assisting in setting the subset of said plurality of base stations in association with a subframe number of said predetermined signal.

According to another aspect
the receiving includes receiving an interference component as part of said measurement result.

REFERENCE SIGNS LIST 10, 10-1, 10-2 eNodeB
12 Core network
20, 20-1, 20-2 UE
30 RRH
104, 204, 304 Antenna group
110, 210, 310 Wireless processing unit
120, 220 DA/AD converter
130 UL signal detector
140 Scheduler
150 DL signal generator
160 ABS setting holding unit
162 CSI-RS period setting holding unit
170, 172 RSRP holding unit
180, 182 CoMP set determining unit
230 DL signal detector
240 UL signal generator
250 ABS setting position holding unit
252 CSI-RS period holding unit

The invention claimed is:
1. An electronic device comprising:
wireless processing circuitry coupled to at least one antenna and configured to:
communicate with a plurality of base stations, the base stations including at least a first base station and a second base station;
receive configuration information indicating one or more Channel State Information-Reference Signal (CSI-RS) insertion periods; and
a signal detector including circuitry configured to measure receiving power in accordance with the configuration information,
wherein the first base station and the second base station have an identical cell ID, and the first base station and the second base station are distinguishable from each other based on a plurality of first CSI-RSs transmitted by the first base station, a plurality of second CSI-RSs muted by the first base station, a plurality of third CSI-RSs transmitted by the second base station, and a plurality of fourth CSI-RSs muted by the second base station, and
wherein the configuration information indicates at least a first period of the first CSI-RSs, a second period of the second CSI-RSs, a third period of the third CSI-RSs, and a fourth period of the fourth CSI-RSs.

2. The electronic device of claim 1, wherein the configuration information further indicates a plurality of CSI-RS insertion periods corresponding to a plurality of base stations.

3. The electronic device of claim 1, wherein the wireless processing circuitry is further configured to communicate with the plurality of base stations by Coordinated Multiple Point transmission and reception (CoMP).

4. The electronic device of claim 1, wherein one of the plurality of first CSI-RSs is received during a timing when one of the plurality of second CSI-RSs is muted.

5. The electronic device of claim 1, wherein the receiving power is measured during a plurality of timings, wherein the first base station is configured to transmit the first CSI-RSs and mute the second CSI-RSs during the plurality of timings, wherein the second base station is configured to transmit the third CSI-RSs and mute the fourth CSI-RSs during the plurality of timings, and wherein each of the plurality of timings are temporally spaced at equal intervals.

6. A wireless communication method comprising:
communicating with a plurality of base stations, the base stations including at least a first base station and a second base station;
receiving configuration information indicating one or more Channel State Information-Reference Signal (CSI-RS) insertion periods; and
measuring receiving power in accordance with the configuration information,
wherein the first base station and the second base station have an identical cell ID, and the first base station and the second base station are distinguishable from each other based on a plurality of first CSI-RSs transmitted by the first base station, a plurality of second CSI-RSs muted by the first base station, a plurality of third CSI-RSs transmitted by the second base station, and a plurality of fourth CSI-RSs muted by the second base station, and
wherein the configuration information indicates at least a first period of the first CSI-RSs, a second period of the second CSI-RSs, a third period of the third CSI-RSs, and a fourth period of the fourth CSI-RSs.

7. An electronic device comprising:
wireless processing circuitry coupled to at least one antenna and configured to:
communicate with a terminal device that is configured to communicate with a plurality of base stations including a first base station and a second base station; and
transmit configuration information to the terminal device, the configuration information indicating one or more Channel State Information-Reference Signal (CSI-RS) insertion periods,
wherein the terminal device is configured to measure receiving power in accordance with the configuration information,
wherein the first base station and the second base station have an identical cell ID, and the first base station and the second base station are distinguishable from each other based on a plurality of first CSI-RSs transmitted by the first base station, a plurality of second CSI-RSs muted by the first base station, a plurality of third CSI-RSs transmitted by the second base station, and a plurality of fourth CSI-RSs muted by the second base station, and
wherein the configuration information indicates at least a first period of the first CSI-RSs, a second period of the second CSI-RSs, a third period of the third CSI-RSs, and a fourth period of the fourth CSI-RSs.

8. The electronic device of claim 7, wherein the configuration information further indicates a plurality of CST-RS insertion periods corresponding to a plurality of base stations.

9. The electronic device of claim 7, wherein the wireless processing circuitry is further configured to communicate with the terminal device by Coordinated Multiple Point transmission and reception (CoMP).

* * * * *